(12) United States Patent
Chiang et al.

(10) Patent No.: US 7,662,265 B2
(45) Date of Patent: Feb. 16, 2010

(54) ELECTROPHORETIC ASSEMBLY OF ELECTROCHEMICAL DEVICES

(75) Inventors: Yet-Ming Chiang, Framingham, MA (US); Benjamin Hellweg, London (GB); Richard K. Holman, Belmont, MA (US); Steven M. Tobias, Cambridge, MA (US); Dong-Wan Kim, Cambridge, MA (US); Ryan Craig Wartena, Cambridge, MA (US)

(73) Assignees: Massachusetts Institute of Technology, Cambridge, MA (US); A123 Systems, Inc., Watertown, MA (US)

( * ) Notice: Subject to any disclaimer, the term of this patent is extended or adjusted under 35 U.S.C. 154(b) by 726 days.

(21) Appl. No.: 11/108,602

(22) Filed: Apr. 18, 2005

(65) Prior Publication Data

US 2005/0272214 A1 Dec. 8, 2005

Related U.S. Application Data

(63) Continuation-in-part of application No. 10/206,662, filed on Jul. 26, 2002, now Pat. No. 7,579,112, and a continuation-in-part of application No. 10/021,740, filed on Oct. 22, 2001, now Pat. No. 7,553,584.

(60) Provisional application No. 60/563,026, filed on Apr. 16, 2004, provisional application No. 60/583,850, filed on Jun. 29, 2004, provisional application No. 60/308,360, filed on Jul. 27, 2001, provisional application No. 60/242,124, filed on Oct. 20, 2000.

(51) Int. Cl.
 *C25D 13/02* (2006.01)
(52) U.S. Cl. .................. 204/491; 204/484
(58) Field of Classification Search .......... 204/490, 204/491, 484
See application file for complete search history.

(56) References Cited

U.S. PATENT DOCUMENTS

| 3,765,943 A | 10/1973 | Biagetti |
| 3,864,167 A | 2/1975 | Broadhead et al. |
| 4,245,016 A | 1/1981 | Rampel |
| 4,555,454 A | 11/1985 | Shuster et al. |
| 4,615,784 A | 10/1986 | Stewart et al. |
| 4,668,596 A | 5/1987 | Shacklette et al. |
| 4,758,483 A | 7/1988 | Armand et al. |

(Continued)

FOREIGN PATENT DOCUMENTS

CA 2270771 10/2000

(Continued)

OTHER PUBLICATIONS

Aleshin, A.N. et al., "Transport Properties of Poly (3,4-Ethylenedioxythiophene)/Poly (Styrenesulfonate)," Synthetic Metals 94:173 (1998).

(Continued)

*Primary Examiner*—Kishor Mayekar
(74) *Attorney, Agent, or Firm*—Wolf, Greenfield & Sacks, P.C.

(57) ABSTRACT

Methods are provided for making bipolar electrochemical devices, such as batteries, using electrophoresis. A bipolar device is assembled by applying a field that creates a physical separation between two active electrode materials, without requiring insertion of a discrete separator film or electrolyte layer.

20 Claims, 17 Drawing Sheets

U.S. PATENT DOCUMENTS

| | | | |
|---|---|---|---|
| 4,889,777 | A | 12/1989 | Akuto |
| 5,100,747 | A | 3/1992 | Hayahida et al. |
| 5,187,209 | A | 2/1993 | Hirai et al. |
| 5,213,895 | A | 5/1993 | Hirai et al. |
| 5,227,267 | A | 7/1993 | Goebel et al. |
| 5,294,504 | A | 3/1994 | Otagawa et al. |
| 5,436,093 | A | 7/1995 | Huang et al. |
| 5,518,833 | A | 5/1996 | Repplinger et al. |
| 5,527,641 | A | 6/1996 | Koshiishi et al. |
| 5,624,605 | A | 4/1997 | Cao et al. |
| 5,654,115 | A | 8/1997 | Hasebe et al. |
| 5,677,080 | A | 10/1997 | Chen |
| 5,714,053 | A | 2/1998 | Howard |
| 5,733,683 | A | 3/1998 | Searson et al. |
| 5,759,714 | A | 6/1998 | Matsufuji et al. |
| 5,789,100 | A | 8/1998 | Burroughs et al. |
| 5,821,033 | A | 10/1998 | Cromack et al. |
| 5,834,136 | A | 11/1998 | Gao et al. |
| 5,897,522 | A | 4/1999 | Nitzan |
| 5,902,689 | A | 5/1999 | Vleggaar et al. |
| 5,925,283 | A | 7/1999 | Taniuchi et al. |
| RE36,843 | E | 8/2000 | Lake et al. |
| 6,096,454 | A | 8/2000 | Tran et al. |
| 6,120,940 | A | 9/2000 | Poehler et al. |
| 6,136,476 | A | 10/2000 | Schutts et al. |
| 6,174,623 | B1 | 1/2001 | Shackle |
| 6,231,779 | B1 | 5/2001 | Chiang et al. |
| 6,300,016 | B1 | 10/2001 | Jan et al. |
| 6,306,540 | B1 | 10/2001 | Hiroi et al. |
| 6,337,156 | B1 | 1/2002 | Narang et al. |
| 6,342,317 | B1 | 1/2002 | Patel et al. |
| 6,528,033 | B1 | 3/2003 | Barker et al. |
| 6,599,662 | B1 | 7/2003 | Chiang et al. |
| 6,787,232 | B1 | 9/2004 | Chiang et al. |
| 7,182,848 | B2 * | 2/2007 | Sarkar .................... 204/487 |
| 2001/0005558 | A1 | 6/2001 | Yoshioka et al. |
| 2001/0005562 | A1 | 6/2001 | Yoshioka et al. |
| 2001/0007726 | A1 | 7/2001 | Yoshioka et al. |
| 2002/0015278 | A1 | 2/2002 | Fukuyama et al. |
| 2002/0036282 | A1 | 3/2002 | Chiang et al. |
| 2002/0048706 | A1 | 4/2002 | Mayes et al. |
| 2002/0074972 | A1 | 6/2002 | Narang et al. |
| 2002/0192137 | A1 | 12/2002 | Chaloner-Gill et al. |
| 2002/0195591 | A1 | 12/2002 | Ravet et al. |
| 2003/0082446 | A1 | 5/2003 | Chiang et al. |
| 2003/0099884 | A1 | 5/2003 | Chiang et al. |
| 2004/0005265 | A1 | 1/2004 | Chiang et al. |
| 2005/0109263 | A9 | 5/2005 | Chiang et al. |

FOREIGN PATENT DOCUMENTS

| | | |
|---|---|---|
| EP | 0 071 119 A2 | 2/1983 |
| EP | 1 042 832 A1 | 10/2001 |
| EP | 1 231 651 | 8/2002 |
| EP | 1 231 653 | 8/2002 |
| JP | 04-58455 | 2/1992 |
| JP | 7101728 A | 4/1995 |
| JP | 9022693 A | 1/1997 |
| JP | 9-147862 | 6/1997 |
| WO | WO 98/12761 A1 | 3/1998 |
| WO | WO 98/16960 A2 | 4/1998 |
| WO | WO 99/33129 | 7/1999 |
| WO | WO 00/41256 A1 | 7/2000 |
| WO | WO 01/77501 A2 | 10/2001 |
| WO | WO 02/43168 A2 | 5/2002 |
| WO | WO 03/012908 A2 | 2/2003 |
| WO | WO 03/056646 A1 | 7/2003 |

OTHER PUBLICATIONS

Arbizzani et al., "$Li_{1.03}Mn_{1.97}O_4$ Surface Modification by Poly(3,4-Ethylenedioxithiophene)," Poster presented at 11$^{th}$ Intl. Meeting on Lithium Batteries, Jun. 23-28, 2002, Monterey, CA.

Armand, M.B. et al., "Poly-Ethers as Solid Electrolytes," Proceedings of the Intl. Conference on Fast Ion Transport in Solids, Electrodes and Electrolytes, Lake Geneva, WI, 131-136 (1979).

Bouridah, A. et al., "Poly(Dimethylsiloxane)-Poly(Ethylene Oxide) Based Polyurethane Networks Used as Electrolytes in Lithium Electrochemical Solid State Batteries," Solid State Ionics, 15:233-240 (1985).

Chiang, Y. et al., "High Capacity, Temperature-Stable Lithium Aluminum Manganese Oxide Cathodes for Rechargeable Batteries," Electrochem. and Solid-State Lett. 2(3):107 (1999).

Elliott, S.R., "Physics of Amorphous Materials," Longman Group Limited., 1984.

French, R.H. et al., "Full Spectral Calculation of Non-Retarded Hamaker Constants for Ceramic Systems from Interband Transition Strengths," Solid State Ionics 75:13 (1995).

French, R.H. et al., "Origins and Applications of London Dispersion Forces and Hamaker Constants in Ceramics," J. Am. Ceram. Soc. 83(9):2117 (2000).

Ghosh, S. et al., "Supramolecular Self-Assembly for Enhanced Conductivity in Conjugated Polymer Blends: Ionic Crosslinking in Blends of Poly(3,4,-Ethylenedioxythiophene)-Poly(Styrenesulfonate) and Poly(vinylpyrrolidone)," Adv. Mater. 10(14):1097 (1998).

Gray, F.M., "Solid Polymer Electrolytes," VCH Publishers Inc. (1991).

Hart, B. W., et al., "3-D Microbatteries," Electrochemistry Communications 5:120 (2003).

Idota, Y. et al., "Tin-Based Amorphous Oxide: A High-Capacity Lithium-Ion-Storage Material," Science 276:1395 (1997).

Kuwabata, S. et al., "Charge-Discharge Properties of Composites of $LiMn_2O_4$ and Polypyrole as Positive Electrode Materials for 4 V Class of Rechargeable Li Batteries," Electrochimica Acta 44:4593 (1999).

Le Cras, F. et al., "Lithium intercalation in Li-Mg-Mn-O and Li-Al-Mn-O spinels," Solid State Ionics 89:203-213 (1996).

Limthongkul, P. et al., "Nanocomposite Li-Ion Battery Anodes Produced by the Partial Reduction of Mixed Oxides," Chem. Mater. 13:2397 (2001).

Linden, D., Editor-in-Chief, Handbook of Batteries, 2d Ed., McGraw-Hill, Inc., USA p. 2.19 (1995).

Long, J.W., et al., "Three-Dimensional Battery Architectures," Chem. Rev. 104:4463 (2004).

Matsumoto, Osamu et al., "Vaporization of Graphite in Plasma Arc and Identification of C60 in the Deposit," J. Electrochem. Soc. 139(1) Jan. 1992.

Milling, A. et al., "Direct Measurement of Repulsive Van Der Waals Interactions Using an Atomic Force Microscope," J. Colloid & Interface Science 180:460 (1996).

Minett, M.G. et al, "Polymeric Insertion Electrodes," Solid State Ionics 28-30:1192-1196(1988).

Nagaoka, K. et al, "High Ionic Conductivity in Poly(dimethyl Siloxane-co-Ethylene Oxide) Dissolving Lithium Perchlorate," Dept. of Chemistry, Sophia University, pp. 659-663.

Neumann et al., "Negative Hamaker Coefficients," Colloid and Polymer Science 257(4):414 (1979).

Ohzuku, T. et al., "Synthesis and Characterization $LiAl_{1/4}Ni_{3/4}O_2$ (R3m) for Lithium-Ion (Shuttlecock) Batteries," J. Electrochem. Soc. 142(12):4033 (1995).

Van Oss, C.J. et al., "Applications of Net Repulsive Van Der Waals Forces Between Different Particles, Macromolecules or Biological Cells in Liquids," Colloids and Surfaces 1:45 (1980).

Van Oss, C.J. et al., "Comparison Between Antigen-Antibody Binding Energies and Interfacial Free Energies," Immunological Communications 6(4):341 (1977).

Van Oss, C.J. et al., "Repulsive Van Der Wials Forces. I. Complete Dissociation of Antigen-Antibody Complexes by Means of Negative Van Der Waals Forces," Immunological Communications 8(1):11 (1979).

Van Oss, C.J. et al., "Repulsive Van Der Waals Forces. II Mechanism of Hydrophobic Chromatography," Separation Science and Technology 14(4):305 (1979).

Wang, C. et al., "All Solid-State Li/Li$_x$MnO$_2$ Polymer Battery Using Ceramic Modified Polymer Electrolytes," J. Electrochemical Soc. 149(8):A967 (2002).

Ep. App. No. 01 988 312.3—2119, "Communication pursuant to Article 96(2) EPC," mailed Mar. 9, 2005.

International Search Report for International Application No. PCT/US 01/48345, mailed Feb. 20, 2003.

Written Opinion for International Application No. PCT/US 01/48345, mailed Aug. 22, 2003

International Preliminary Examination Report for International Application No. PCT/US 01/48345, mailed Feb. 25, 2004.

* cited by examiner

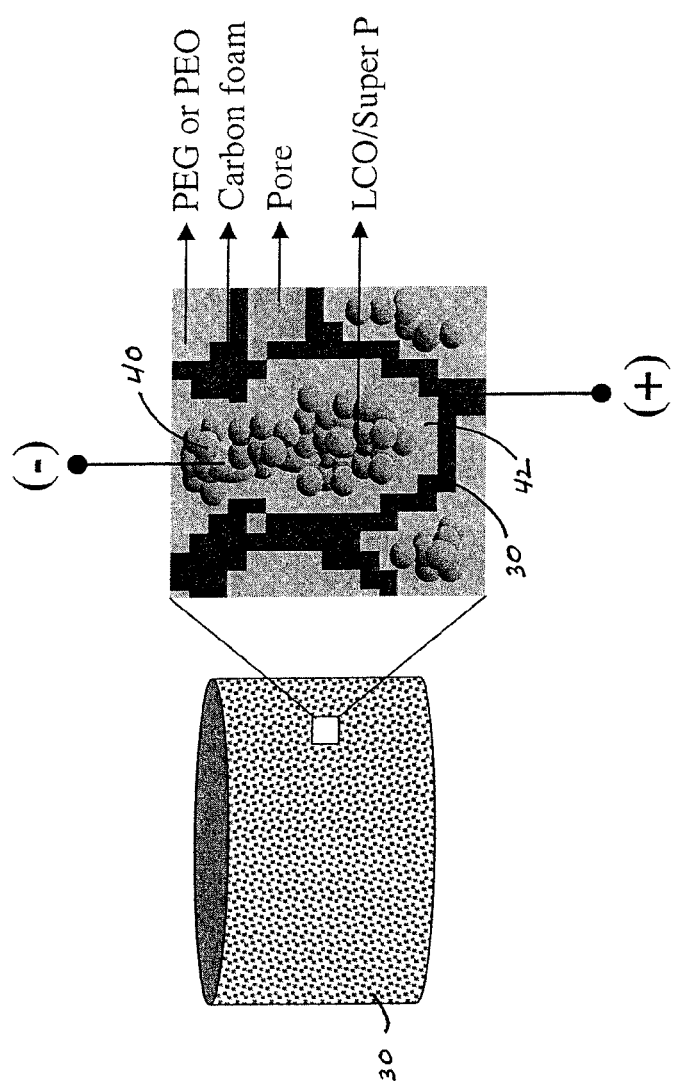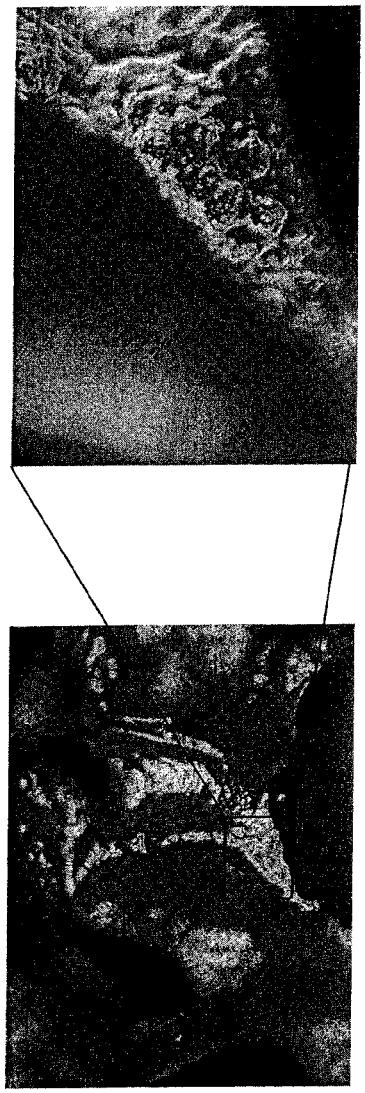
Figure 4

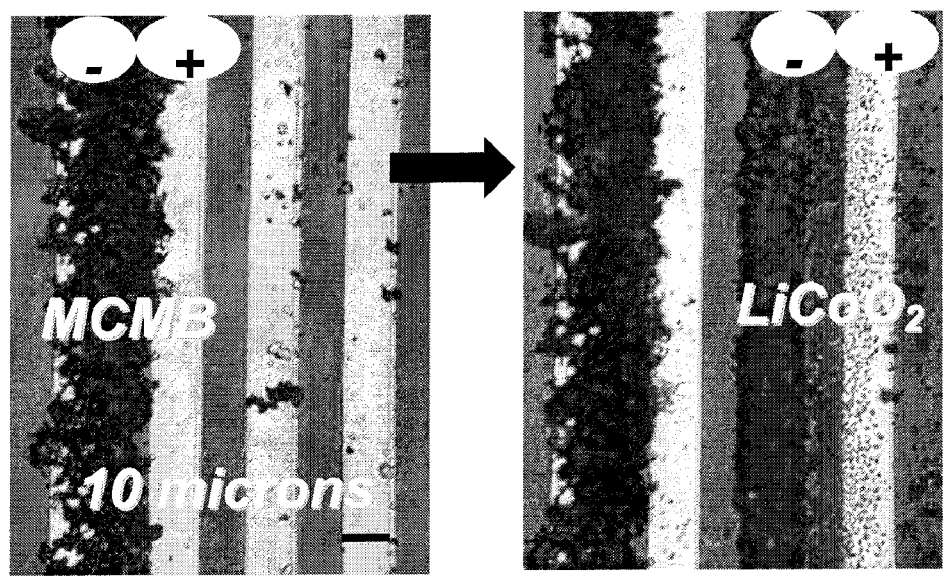
Figure 12 A                    Figure 12B
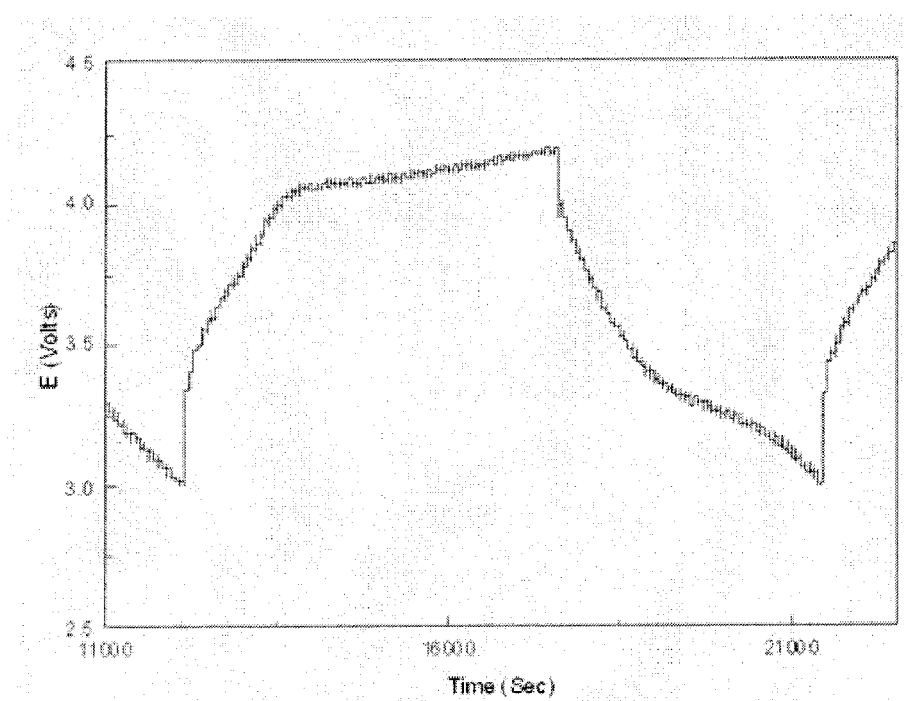
Figure 13

ELECTROPHORETIC ASSEMBLY OF ELECTROCHEMICAL DEVICES

CROSS-REFERENCE TO RELATED APPLICATIONS

This application claims priority to U.S. Provisional Application No. 60/563,026, filed on Apr. 16, 2004, and U.S. Provisional Application No. 60/583,850, filed on Jun. 29, 2004, which are incorporated by reference herein. This application is also a continuation-in-part of U.S. patent application Ser. No. 10/206,662, filed on Jul. 26, 2002, now U.S. Pat. No. 7,579,112, which claims priority to U.S. Provisional Application No. 60/308,360, filed Jul. 27, 2001, and is a continuation-in-part of U.S. patent application Ser. No. 10/021,740, filed Oct. 22, 2001, now U.S. Pat. No. 7,553,584, which claims priority to U.S. Provisional Application No. 60/242,124, filed Oct. 20, 2000, each of these applications are incorporated by reference herein.

GOVERNMENT RIGHTS

This invention was made with government support under Grant Number F49620-02-1-0406, awarded by the Air Force, and Grant Number NMA501-03-01-2004, awarded by the Department of Defense. The government has certain rights in the invention.

BACKGROUND

1. Field

The field includes methods of making bipolar devices using electrical potentials and electric fields, and in particular methods of making bipolar electrochemical devices, such as batteries, using electrophoresis.

2. Summary of the Related Art

Batteries, and particularly rechargeable batteries, are widely used in a variety of devices such as cellular telephones, laptop computers, personal digital assistants, and toys. Manufacturing constraints generally limit the available shapes of batteries, with common form factors including cylinders, button cells (thin discs), and prismatic forms. The energy density of such batteries is relatively low, due to poor volumetric utilization of space within the electrochemical devices. Recently "three-dimensional batteries" have been proposed, which have anodes and cathodes with active surface areas exposed in three dimensions, and potentially exhibit improved performance results compared to standard battery geometries. A need exists for new manufacturing methods to create electrochemical devices with improved energy density, power density, and cycle life, as well as reduced manufacturing cost.

Electrophoresis, the motion of charged particles under an applied electric field, is used to characterize the behavior of solutions and suspensions, and has also been used to deposit materials in the form of thin films, coatings, and even bulk products. The formation of battery electrodes by electrophoretic deposition has been disclosed (e.g., Kanamura et al., *Electrochemical and Solid-State Letters*, 3:259-262 (2000)). Typically, a coating is electrophoretically deposited on a metal substrate from a suspension of particles in a liquid. The deposited coating is then removed from the apparatus or bath in which the deposition was carried out, and subsequently used for a desired application. For example, to prepare a battery, an electrophoretically-deposited electrode is removed from its liquid deposition bath, dried, and used as a component in a device assembly. However, the act of electrophoresis does not by itself create a complete device.

SUMMARY

Methods are provided for making bipolar electrochemical devices using electrophoresis. Potentials (e.g., electrical potentials) and fields (e.g., electrical fields) are used to assemble a variety of electrochemical device architectures, including two-dimensional and three-dimensional constructions for batteries, capacitors, fuel cells, electrochromic displays, and sensors. The disclosed electrophoretic assembly methods do not require insertion of a discrete separator film or electrolyte layer, and are useful for producing devices with reduced manufacturing cost and improved energy density, power density, and cycle life.

In certain embodiments, the methods described herein utilize the electric-field assisted deposition of an electroactive material from a medium. The electroactive material is suspended in the medium, and may be in the form of colloidal particles, macromolecules, molecules, or ions. Hereafter, it should be understood that the term "particles" refers to any of the above forms.

One aspect provides a method of assembling a bipolar device including a first terminal and a second terminal, and a device made according to the method. The method includes providing the first terminal and providing particles of a first electroactive material in a medium. The method further includes providing the second terminal electronically connected to a second electroactive material. The method further includes generating a field causing particles of the first electroactive material to form an electronically continuous electrode, and creating an electronically insulating separation between the first and second electroactive materials. The electronically insulating separation between the first and second electroactive materials is preserved in the final device.

In certain embodiments, the method comprising generating an electrical field causing particles of the first electroactive material to form an electronically continuous electrode, and creating an electronically insulating separation between the first and second electroactive materials. The electrical field can be generated by applying an electrical potential between the first terminal and the second terminal; or, between one of the first and second terminals and a third terminal. The electrical field can attract particles of the first electroactive material to the first terminal. In some cases, the electrical field attracts particles of the first electroactive material to the first terminal and/or repels particles of the first electroactive material from the second electroactive material in the medium.

In certain embodiments, the method also includes providing an ionically conductive material in the electronically insulating separation between the first and second electroactive materials. In some embodiments, the ionically conductive material is a liquid electrolyte. In some embodiments, the medium includes a polymer, and preserving the electronically insulating separation between the first and second electroactive materials includes solidifying, or drying, the polymer to form a solid polymer electrolyte.

In some embodiments, the method further comprises depositing particles of the first electroactive material on the first terminal.

In certain embodiments, the second electroactive material has a three-dimensional structure defining a void space, and wherein the field causes particles of the first electroactive material to concentrate in the void space. The second electroactive material may be a porous electrode, and wherein the field causes particles of the first electroactive material to concentrate in the pore space of the porous electrode. The porous electrode may be a reticulated open-cell carbon, metal or ceramic foam.

In some embodiments, wherein particles of at least one of the first and second electroactive materials are coated with a conductive material.

In some embodiments, at least one of the terminals is patterned to include a serpentine, spiral, or comb-like region and further comprising depositing electroactive material in the region. In some cases, the first and second terminals are constructed and arranged to be interdigitated.

In some embodiments, the method further comprises depositing particles of the first electroactive material on the first terminal thereby forming an electronically continuous first electrode; and, generating a second field causing particles of the second electroactive material to deposit on the second terminal, thereby forming an electronically continuous second electrode. The method may further comprise creating an electronically insulating separation between the first and second electrodes; and, preserving the electronically insulating separation between the first and second electrodes.

The first and second electrodes may be formed simultaneously, or sequentially.

In certain embodiments, the method also includes applying an electrical potential to the first terminal, thereby creating an attractive force between the first electroactive material and the first terminal. In at least some such embodiments, particles of the first electroactive material are deposited at the first terminal.

In some embodiments, the second electroactive material has a three-dimensional structure defining a void space, and the repulsive force between the first and second electroactive materials causes particles of the first electroactive material to concentrate in the void space. In certain embodiments, the second electroactive material is a porous electrode, and the repulsive force between the first and second electroactive materials causes particles of the first electroactive material to concentrate in the pore space of the porous electrode. In some embodiments, the porous electrode is a reticulated open-cell carbon, metal or ceramic foam.

In certain embodiments, particles of at least one of the first and second electroactive materials are coated with a conductive material.

Another aspect provides a method of making an electrode and an electrode made according to the method. The method includes providing a first terminal and providing conductive particles of an electroactive material in a medium. The method further includes providing a second terminal. An electrical potential is applied between the first and the second terminal to deposit conductive particles of the electroactive material at the first terminal thereby forming an electronically continuous electrode. A continuous bridge of conductive particles of the electroactive material is formed between the first and second terminals. The applied electrical potential is removed.

In some embodiments, the method further comprises providing a third terminal and providing conductive particles of a second electroactive material in a medium. The method further comprises providing a fourth terminal and applying an electrical potential between the third and the fourth terminals to deposit conductive particles of the second electroactive material at the third terminal thereby forming a second electronically continuous electrode. A second continuous bridge of conductive particles of the second electroactive material is formed between the third and fourth terminals. The applied electrical potential is removed.

Another aspect provides a battery. The battery comprises a substrate, a first terminal, a second terminal; and a localized conductive region comprising electroactive material formed on the substrate and surrounded by an insulating region. At least one of the first and second terminals is electronically connected to the conductive region.

Other aspects, embodiments and features of the invention will become apparent from the following detailed description of the invention when considered in conjunction with the accompanying drawings. The accompanying figures are schematic and are not intended to be drawn to scale. In the figures, each identical, or substantially similar component that is illustrated in various figures is represented by a single numeral or notation. For purposes of clarity, not every component is labeled in every figure. Nor is every component of each embodiment of the invention shown where illustration is not necessary to allow those of ordinary skill in the art to understand the invention. All patent applications and patents incorporated herein by reference are incorporated by reference in their entirety. In case of conflict, the present specification, including definitions, will control.

BRIEF DESCRIPTION OF THE DRAWINGS

FIG. 4A is a schematic illustration of spatially concentrating a cathode material in the pore space of a porous foam anode using electrophoresis according to certain embodiments. FIG. 4B is an expanded view of the foam.

C. in He gas for 4 hours, showing low first-cycle irreversibility and low capacity fade to 10 cycles.

FIGS. 10A-C are plots of galvanostatic voltage-capacity curves at C/24 rate for an electrophoretically assembled cell, calculated for $LiCoO_2$ mass. FIG. 10A shows a first charge curve exhibiting large excess capacity attributed to the reversal of electrochemical reactions induced during electrophoresis. FIG. 10B shows discharge curves for the first few cycles exhibiting similar voltage profiles, with the capacity varying with upper voltage limit during charge. FIG. 10C shows the sixth cycle exhibiting polarization during charge and discharge of ~0.2V about the open circuit voltage.

Figure 11:
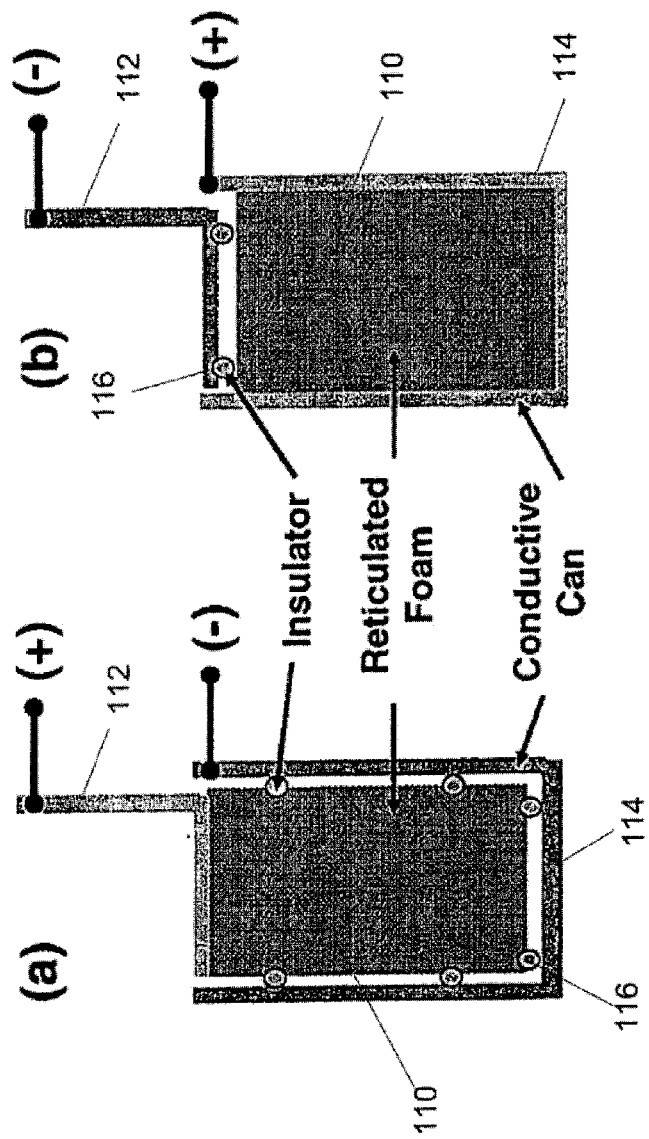

FIGS. 11A-B are schematic illustrations of cell designs in which a can and a tab are used as working electrodes for electrophoretic forming, and subsequently are used as current collectors of the resultant battery.

FIGS. 12A-B show a two-step deposition process for the electrophoretic assembly of a battery as described in Example 8.

FIG. 13 shows the charge and discharge for cycle number 40 for the battery of FIGS. 12A and 12B as described in Example 8.

Figure 14A:
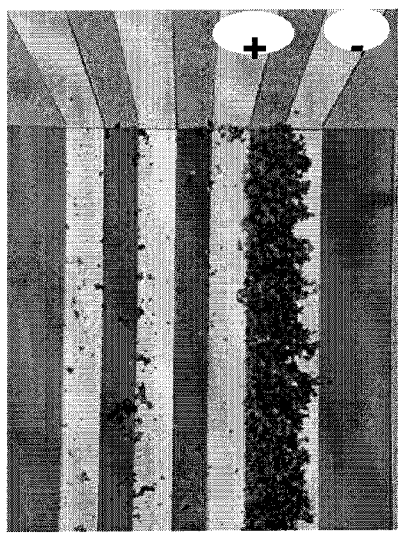
Figure 14B:
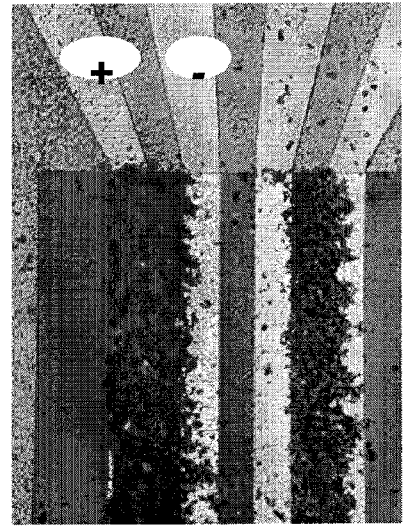

FIGS. 14A-B show a two-step process for making a battery by electrophoretic deposition on a set of four electrodes as described in Example 8.

Figure 15:
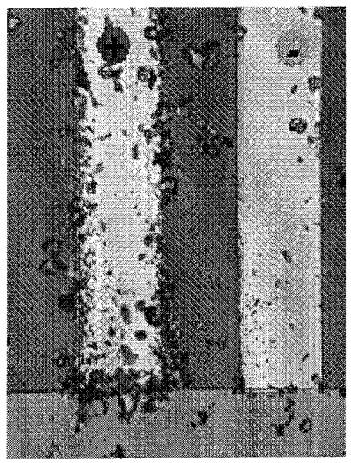
Figure 15B:
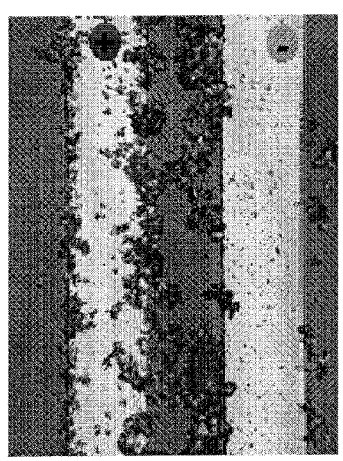
Figure 15C:
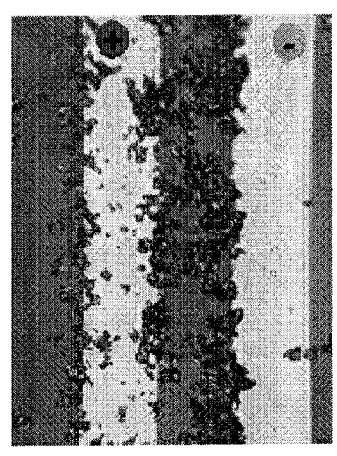

FIGS. 15A-C show the deposition from a mixture of 1 wt % $LiCoO_2$ in acetone at 2, 2.5 and 3 V, respectively, as described in Example 9.

Figures 16A, 16B, 16C:
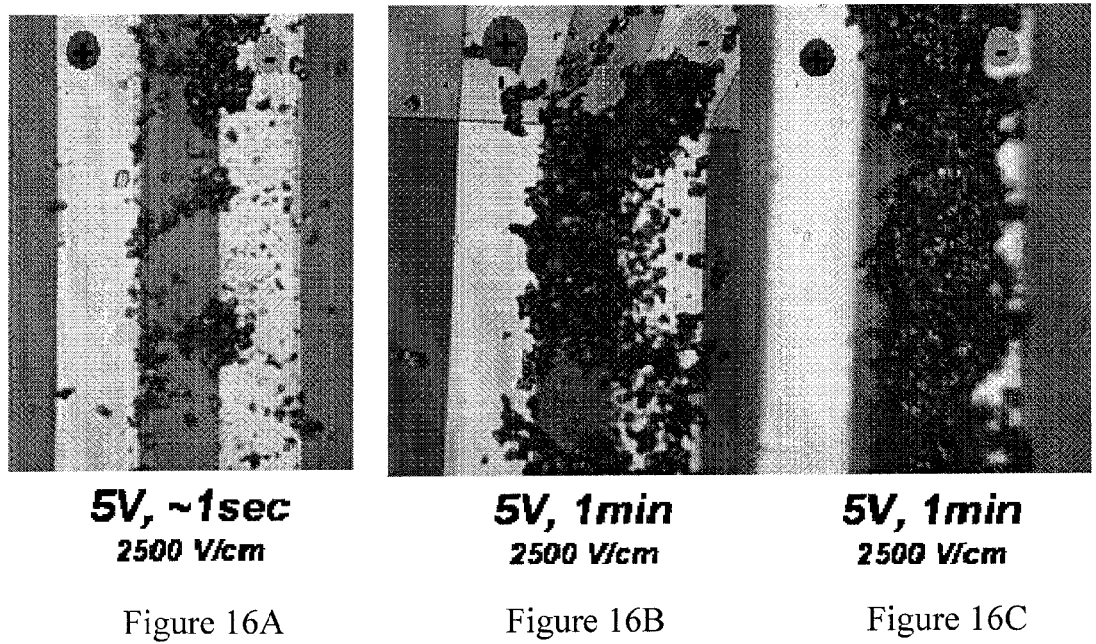

FIGS. 16A-C show the deposition from a mixture of 1 wt % $LiCoO_2$ in acetone at 5 V as described in Example 9.

Figure 17:
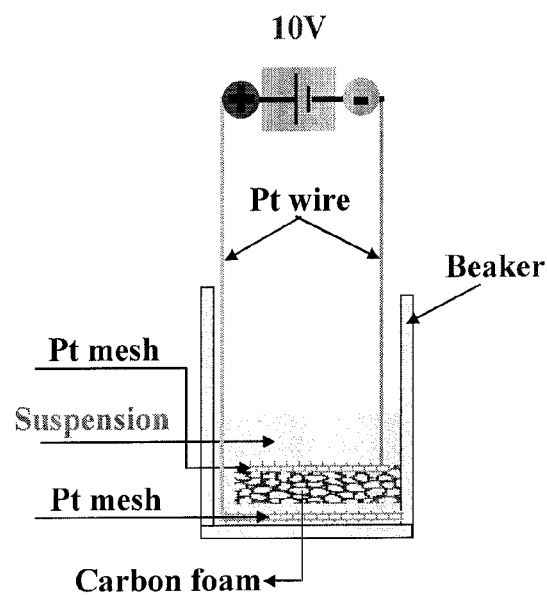

FIG. 17 shows a reticulated carbon foam attached to a second Pt mesh current collector, and placed above a first Pt mesh current collector as described in Example 7.

Figure 18:
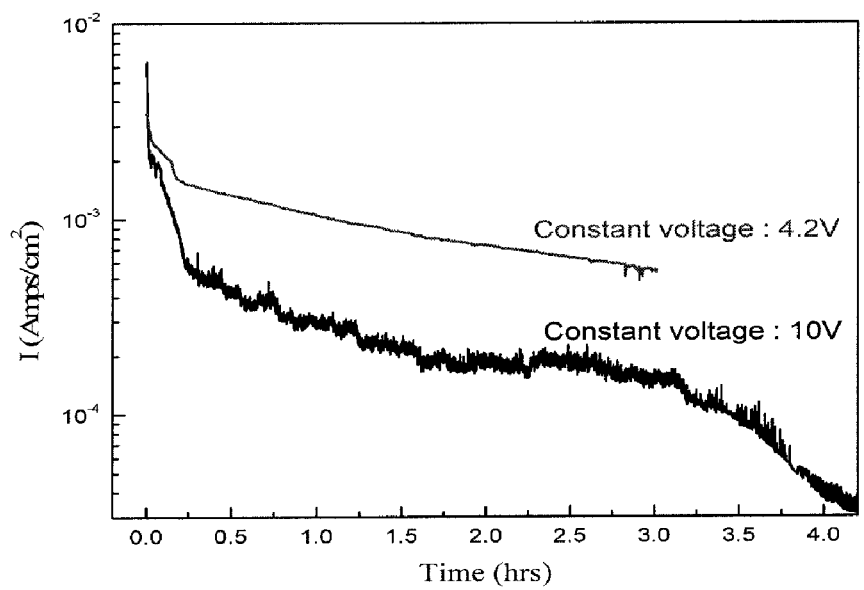

FIG. 18 shows the current measured between two current collectors as a function of time for two values of applied voltage as described in Example 7.

Figure 19:
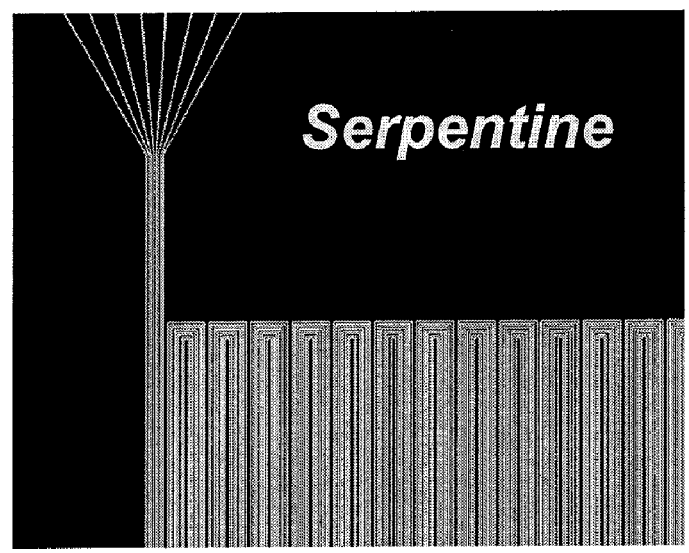

FIG. 19 shows a pattern of terminals having a serpentine configuration as described in Example 10.

Figure 20:
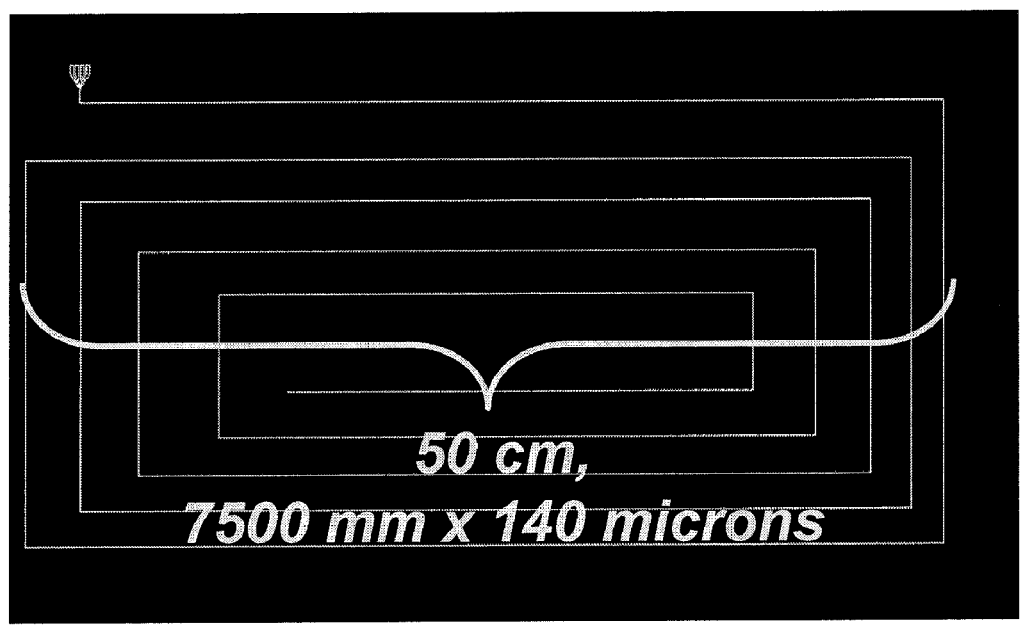

FIG. 20 shows a pattern of terminals having a spiral configuration as described in Example 10.

Figure 21:
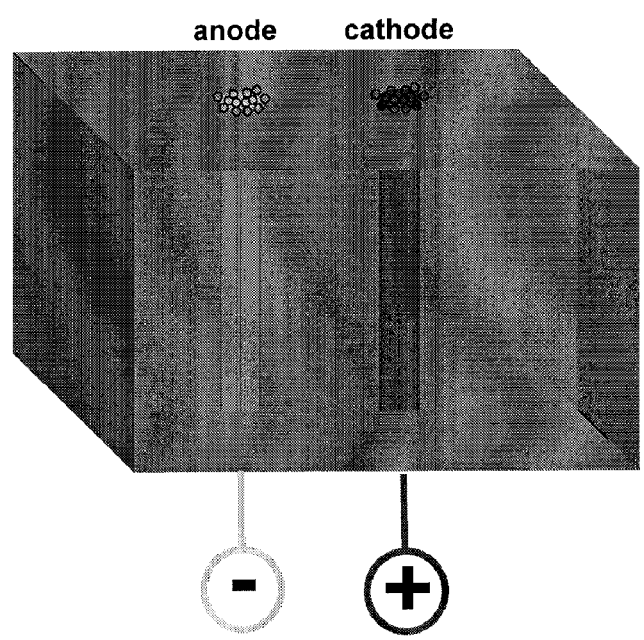

FIG. 21 illustrates configurations of terminals allowing deposition corresponding to the method of Example 3 as described in Example 11.

Figure 22:
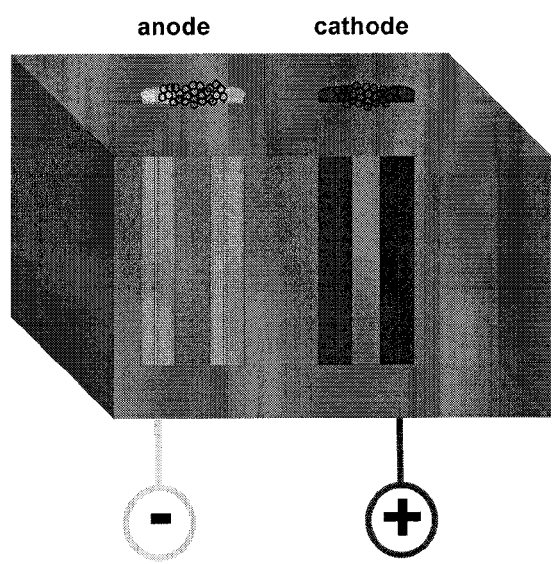

FIG. 22 illustrates configurations of terminals allowing deposition corresponding to the method of Example 8 as described in Example 11.

DETAILED DESCRIPTION

The invention provides methods of assembling bipolar electrochemical devices using electrophoresis. Electrical potentials and electric fields are used to form electrochemical junctions between positive and negative electrodes, and electrochemical devices are fabricated with a variety of internal designs or architectures, including one-, two-, and three-dimensional constructions. By way of non-limiting example, methods as disclosed herein are useful for making laminated devices, bobbin construction batteries and variants thereof, planar interpenetrating electrode structures, and three-dimensional interdigitated and interpenetrating structures, such as those based on the infiltration of one porous electrode with an opposing electrode. Many such device architectures are described in detail in U.S. patent application Ser. No. 10/206,662, published as U.S. 2003/0099884 A1, which is incorporated by reference herein. Non-limiting examples of device configurations suitable for assembly by electrophoretic methods as described herein include a cell comprising a single pair of parallel linear electrodes, a single planar cell stack consisting of a laminate having one positive and one negative electrode, multiple laminates or multilayer stacks, a two-dimensional array of alternating linear electrodes, a two-dimensional interdigitated electrode array, a three-dimensional array of interdigitated electrodes, three-dimensional interpenetrating electrode arrays, three-dimensional interpenetrating electrode arrays in which at least one electrode is in the form of an open-cell foam, a sintered porous particle aggregate, a mat of fibers or ribbons, a weave of fibers or ribbons, stacked mats or weaves of fibers or ribbons, and non-interpenetrating or non-interdigitated cells in which at least one electrode is porous.

Methods of the invention are useful for assembling electrochemical devices including but not limited to batteries (of primary or secondary type), capacitors, fuel cells, electrochromic displays and windows, and sensors. Advantageously, assembly of devices according to electrophoretic methods as described herein does not require insertion of a discrete separator film or electrolyte layer, as is conventionally done in the fabrication of electrochemical devices. Devices assembled as described herein can be "separatorless" because an electronically insulating, ionically conductive layer is formed in situ between the anode and cathode during electrophoretic assembly. Methods as described herein are useful for assembling devices with lower manufacturing cost, higher energy density and power density, and longer cycle life than comparable devices produced by conventional methods.

In at least some embodiments, electrophoretic assembly of a device is carried out by applying an electrical potential between two electrodes that subsequently are used as the terminals or working electrodes of the device. For example, in certain embodiments, electrophoresis is used to deposit a first electrochemically active material, and optionally additives, at a first electrode, current collector, or terminal of a device. Electrophoresis is effected by applying an electrical potential between the first electrode and a second electrode, current collector, or terminal of the device. The potential applied to the second electrode causes it to repel the first active material. In at least some instances, the first active material is also attracted to the first electrode. By applying an electrical potential between the two terminals of the device, a physical separation is produced between the two active electrode materials without requiring the insertion of a discrete separator film or electrolyte layer, as is conventionally done in the fabrication of electrochemical devices such as batteries, capacitors, fuel cells, and electrochromic devices. In at least some embodiments, electrophoresis is carried out in a fluid medium that remains between the electrophoretically separated materials. In certain embodiments, by limiting the volume available to the electrophoretically mobile particles, a device is produced with very small diffusion distances between electrodes.

In some embodiments, the second electrode of the device being assembled by electrophoresis is a terminal or current collector at which a second active material previously has been deposited, by electrophoretic or other means. In certain embodiments, the second electrode is itself made up of a functional electrochemically active material. In some instances, the second electrode is assembled by electrophoresis simultaneously with the first electrode, or sequentially before or after the first electrode.

Figure 1:
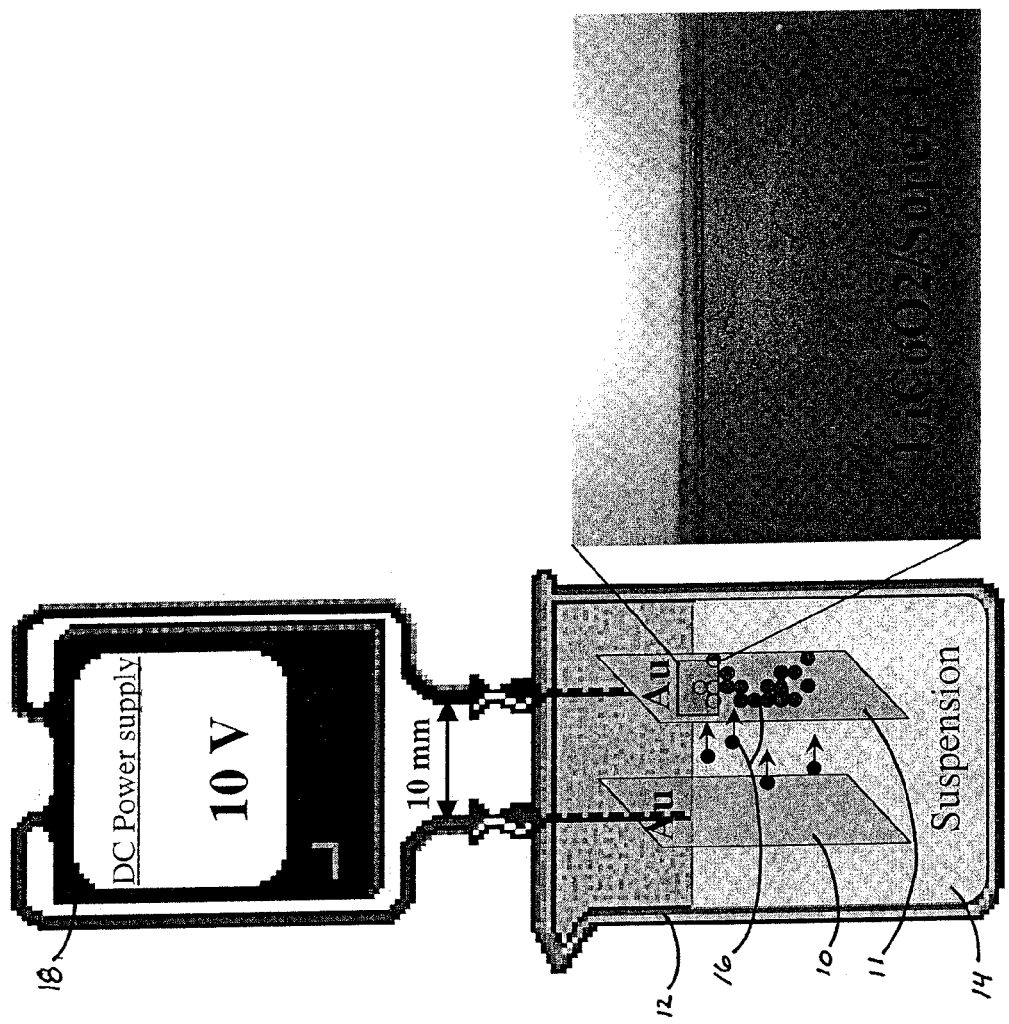
FIG. 1 is a schematic illustration of depositing an electrochemically active material using electrophoresis according to certain embodiments.

FIG. 1 illustrates an exemplary arrangement for depositing electroactive materials by electrophoresis, as described in more detail in Example 1 below. As shown in FIG. 1, two parallel films of gold 10, 11 sputtered on glass are placed in a beaker 12. A suspension 14 of electrophoretically mobile particulates 16 of one or more materials is placed in the beaker 12. In the illustrated embodiment, the particulates are $LiCoO_2$, a lithium intercalation cathode active material for lithium ion batteries, and Super P™, a high surface area conductive carbon used in lithium battery electrode formulations. A DC power supply 18 is used to apply a voltage to the electrodes 10, 11. The voltage causes the particulates 16 to be repelled from one electrode 10 and migrate toward, and eventually deposit on, the other electrode 11.

Figure 2:
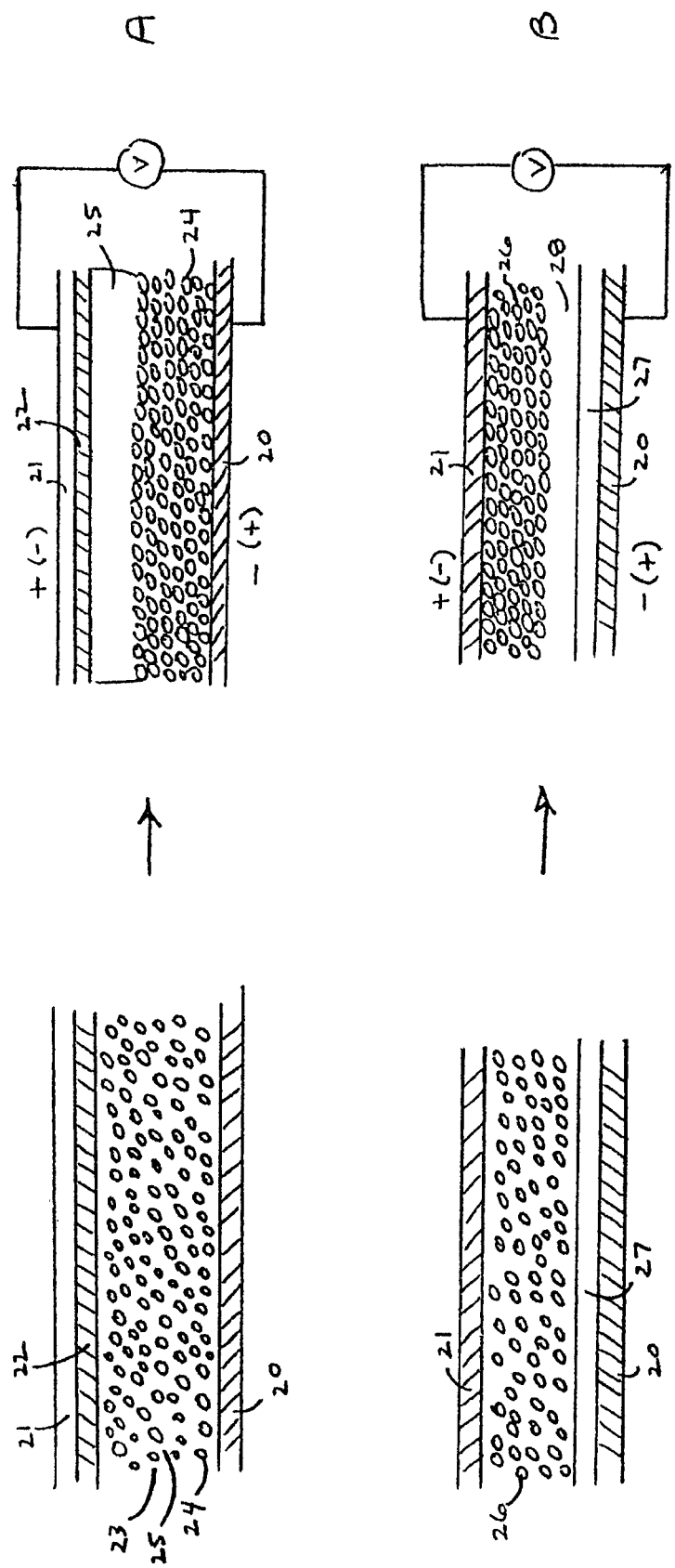
FIGS. 2A-B are schematic illustrations of the formation of layered battery configurations using electrophoretic deposition and simultaneous separation according to certain embodiments.

Non-limiting examples of layered or laminated battery cells made using electrophoretic deposition and simultaneous separation are shown in FIGS. 2A-B. Referring to FIG. 2A, to carry out electrophoretic assembly, a voltage is applied between a sheet or mesh cathode current collector 20 and an anode current collector 21, which is connected to a lithium metal or carbon anode 22. A colloidal suspension 23 containing particles of an intercalation compound 24, a polymer electrolyte 25, and a lithium salt (e.g., $LiClO_4$), with or without an organic solvent, is provided between the current collectors 20, 21. Upon application of voltage, the particles of intercalation compound 24 are deposited to form an electronically conducting network on the cathode current collector 20. The polymer electrolyte 25 is solidified, and forms a permanent separator between the electrodes. Referring to FIG. 2B, a fluid mixture of anode particles 26 in a molten polymer or polymer solution is provided between an anode current collector 21, and a cathode current collector 20, which is connected to a cathode film 27. Upon application of a voltage across the current collectors 20, 21, the anode particles 26 are deposited on the anode current collector 21, and an in situ formed isolation layer 28 is created between the electrodes.

Non-limiting examples of suitable electrochemically active materials for use in electrophoretic methods as described herein include ion storage materials for assembling a battery, electrochromically active materials for assembling certain electrochromic devices, high surface area active materials for assembling certain electrochemical capacitors, active materials for hybrid battery-capacitor devices utilizing both Faradic and capacitive charge storage, and electrodes or catalysts for certain fuel cell assemblies. Useful additives include but are not limited to conductive particles that increase the electrical conductivity of the deposited material, such as conductive carbon, metallic particles, or conductive polymer dispersions, or binders that improve the adherence of the deposited particles to each other or to a current collector.

Suitable materials for electrophoretic assembly are identified by their ability to meet a desired function in the subject electrochemical device. For example, in a rechargeable lithium ion battery, an intercalation oxide able to reversibly store lithium at a high potential with respect to lithium metal is useful as the active material at the positive electrode. Such materials are well-known to those having ordinary skill in the art, and include ordered-rocksalt compounds such as $LiCoO_2$, $LiNiO_2$, $Li(Al, Ni, Mn)O_2$, $LiMnO_2$, and solid solutions or doped combinations thereof; spinel structure compounds such as $LiMn_2O_4$ and its doped counterparts or solid solutions with other metal oxides; ordered olivines such as $LiFePO_4$, $LiMnPO_4$, $LiCoPO_4$, and their doped counterparts or solid solutions; and other ordered transition metal phosphates such as those of so-called Nasicon structure type and their derivatives and related structures. For the active material at the negative electrode of a lithium-ion battery, examples of suitable compounds include compounds such as graphitic or disordered carbons; metal oxides that intercalate lithium such as $Li_4Ti_5O_{12}$ spinel and its derivatives; and other metal oxides or their solid solutions that undergo intercalation or displacement reactions such as tin oxide, indium tin oxide, or first-row transition metal oxides; and crystalline or amorphous metals and alloys of metals or metalloids such as Si, Al, Zn, Sn, Ag, Sb, and Bi. For a primary battery, suitable electrode-active materials include without limitation those well-known to those of ordinary skill in the art to form useful electrochemical couples, such as Zn and $MnO_2$ in the case of the aqueous Leclanche or alkaline-manganese cells, zinc and mercuric oxide in the case of a "mercury cell," or lithium and copper oxide or lithium and manganese oxide in the case of primary lithium batteries. For an electrochemical capacitor or hybrid battery-capacitor, useful electrode materials include without limitation high surface area carbons or metal oxides. For an electrochromic displaying or transmitting device, useful active materials include but are not limited to transition metal oxides and other chromophoric compounds that change color or optical transmission upon being electrochemically oxidized or reduced. For a fuel cell membrane assembly, useful active materials include without limitation conductor and catalyst particles serving as the positive or negative electrode.

Materials and materials combinations for electrophoretic assembly are also selected by the direction and rate at which they migrate under an applied electric field. Electrophoresis can be effected for charged entities of widely ranging sizes, as large as particulates many micrometers in size or as small as individual molecules and ions. In a liquid medium, charged particles and molecules have an electrophoretic mobility whose sign is given by the direction of motion, and whose magnitude is given by the velocity of the entity under a given magnitude of electric field. Methods for determining electrophoretic mobility are well-known to those having ordinary skill in the art of colloids, powder materials processing, or surface chemistry. For many materials dispersed in aqueous or nonaqueous media, the zeta potential, which is defined as the electrical potential at a dividing plane separating electrical charge that is fixed to the solid and that which is freely mobile in the fluid, is tabulated or can be predicted or can be measured by standard methods. The sign and magnitude of the surface charge on particular material particles can be selected or altered in a number of ways well-known to those having ordinary skill in the art, including but not limited to varying the solvent or solvents, pH of the suspension, concentration of added salts, or by adding various charged molecules or surfactants that adsorb to the particle surface. As shown herein, the zeta potential can also be controlled by varying the magnitude of the applied voltage between the electrodes effecting deposition, such that at a low voltage the zeta potential has one value, and at a higher voltage the zeta potential has a different value or even a different sign. The voltage at which the sign of the zeta potential may change differs for different solvents or mixtures of solvents and dissolved salts or organic species, and can also be determined through methods well-known to those skilled in the art. One or more of these factors are employed in order to select the materials and solvent system for electrophoresis. The rate of deposition of particles at a particular electrode is determined by controllable experimental variables well-known to those of ordinary skill in the art, including but not limited to the magnitude of the voltage and the electric field, the particle concentration in suspension, magnitude of the zeta potential, size and shape of the particle, and viscosity of the medium. As illustrated in Example 1 below, direct observation of the direction of motion and rate of deposition of a desired particulate material under electric field is readily performed, and is an effective means of screening or selecting materials and materials combinations.

In some embodiments, the particles undergoing electrophoretic migration are coated with a conductive material that optionally also determines the zeta potential or electrophoretic mobility of the particles. Suitable coatings include carbonaceous materials; conductive oxides, including but not limited to indium tin oxide, doped tin oxides, and doped zinc oxides; and conductive polymers. Conductive polymer coatings are useful for providing high electronic conductivities, adequate lithium ion diffusivity, and lower elastic modulus, such that upon contact the contact points are deformable, resulting in greater contact area between particles and greater electronic conductivity for the electrophoretically concentrated network. Suitable polymers include, for example, commercially available conductive polymers such as Baytron® P (Bayer AG, Leverkusen, Germany), poly 3,4-ethylenedioxythiophene/polystyrenesulfonic acid complex, and conductive polymers described in U.S. patent application Ser. No. 10/876,179, published as U.S. 2005/0034993 A1, which is incorporated by reference herein. Some such polymers have electronic conductivity of at least about 1 S/cm, and as high as about 75 S/cm. In some instances, the conductive component includes one or more groups selected from polyaniline, polypyrrole, polyacetylene, polyphenylene, polythiophene, polyalkylenedioxythiophene, and combinations thereof. In certain embodiments, the conductive polymer includes one or more groups selected from Structures I-V:

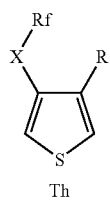

Th (I)

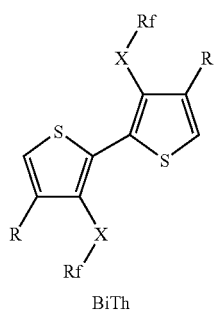

BiTh (II)

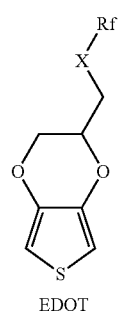

EDOT (III)

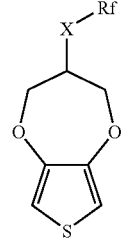

PrODOT (IV)

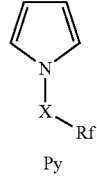

Py (V)

wherein Rf is a fluorinated alkyl group, aryl group, or combination thereof, X is a linking group attaching Rf to the polymer backbone, and R is a pendant group chosen from X-Rf, H, and methyl. In some embodiments, X includes one or more groups selected from alkyl, ether, thioether, ester, thioester, amine, amide, and benzylic groups. In some embodiments, the polymer includes one or more groups selected from EDOT-F (pentadecafluoro octanoic acid 2,3-dihydro-thieno[3,4-b][1,4]dioxin-2-ylmethyl ester), Th—O-1,7 (3-pentadecafluorooctyloxythiophene), Me-Th—O-1,7 (3-methyl-4-pentadecafluorooctyloxythiophene), and PrODOT-F (propylenedioxythiophene pentadecafluorooctane ester).

In at least some embodiments, the mode of electrophoretic deposition is determined by varying the composition of the particle suspension from which deposition occurs, the dimensions and separation of the electrodes, and/or the applied voltage. In certain embodiments, the "mode" of electrophoretic deposition includes one or more of the following. In one mode, highly conductive particles that, upon deposition, form a continuous network of conductive particles, have the effect of extending the conductive electrode at which deposition occurs. The electric field causing deposition is determined by the applied voltage, and the separation between the electrodes. This mode of deposition is susceptible to the formation of locally increased electric field where particles deposit. This in turn increases the deposition rate, leading to an instability of the deposited layer, which causes the formation of branches or "dendrites." Such dendrites can subsequently lead to a continuous bridge between electrodes, causing an electrical short circuit, especially when the electrodes are closely spaced in relation to the thickness of the desired deposit (for example, an electrode spacing less than about five times the thickness of the deposited layer, if deposited uniformly). In certain embodiments, this mode of electrophoretic deposition is used to practical advantage, to control the location and amount of electrodeposited active material. In at least some such embodiments, a pair of deposition electrodes is used to create each final electrode.

When the deposited particles are largely insulating, the mode of deposition generally differs from the previous one, in that the deposited particles do not cause significant increase in the electric field through the narrowing of the electrode gap. In this mode, referred to as "plating," the deposited layer of particles typically remains relatively uniform in thickness as the particles deposit. Another mode of deposition that results in a uniform thickness of deposit occurs when the electrophoretic velocity of the particles is sufficiently greater than the diffusional velocity of the particles. In this mode, the particles are deposited before they have an opportunity to diffuse laterally under Brownian motion to an extent allowing the formation of dendrites, and the deposit is typically uniform. This mode generally occurs under high electric fields, e.g., for closely spaced electrodes and/or high applied voltages, and the particles deposited are primarily limited to those present between the electrodes when the field is initially applied. A certain extent of dendrite formation is allowable before electrical shorting between the electrodes occurs. The ratio of electrophoretic velocity to diffusional velocity necessary to prevent shorting due to dendrite formation depends on the density of particles in the suspension, the thickness of the deposit, the electrode geometry and the spacing of electrodes, amongst other factors, and is readily determined by direct experimentation.

Yet another mode of deposition typically occurs under high applied voltage in electrolytic solutions. It was surprisingly observed that the bridging phenomenon leading to electrical shorting between deposition electrodes can be avoided when the applied voltage is sufficiently large, greater than about 5 volts and preferably about 10 volts. In this case, even closely spaced electrodes or deposits do not electrically short, and a densely packed electrode system is facilitated. Since our discovery, similar observations of this phenomenon during the electrodeposition of carbon nanotubes have been reported by Kamat et al., *J. Am. Chem. Soc.* 126:10757-10762 (2004). In another embodiment, electrical shorting between electrodes is prevented by providing in liquid suspension or solution other constituents that are electronically insulating and deposit more quickly than the electronically conductive active materials. Such constituents include, for example, a polymer or other organic material, components of a dissolved lithium salt, or a reaction product formed at the electrode surface upon the electrodeposition of such a constituent. The reaction product results from a reaction between the deposited constituent and another constituent of the suspension, or between the deposited constituent and the electrode material itself, such as a lithium carbonate forming on the surface of a carbon electrode.

In at least some embodiments, selection of a separator or electrolyte material that remains between the electrophoretically separated materials is carried out in the following manner. The separator material is electronically insulating. In some embodiments, the separator is itself an ion-conducting electrolyte, or is rendered ionically conducting after electrophoretic separation, for example, by infusing with an electrolyte. Suitable separator materials include organic, inorganic, and organic-inorganic hybrid materials. By way of non-limiting example, to create a solid polymer electrolyte in a final device, a solvent such as acetonitrile is selected, in which the following are soluble: a polymer that is the basis for a solid polymer electrolyte, such as polyethylene oxide (PEO); and a lithium salt that dissociates in the polymer and renders it ionically conducting, such as $LiClO_4$. Many such lithium salts are known to those of ordinary skill in the art. After electrophoretic separation and drying, a $LiClO_4$-doped PEO solid electrolyte remains.

In certain embodiments, electrophoretic separation is conducted in the polymer electrolyte itself, at an elevated temperature where it is molten. That is, the molten electrolyte is the liquid solvent. After separation is conducted at elevated temperature, the device is cooled to a lower temperature to preserve the structure. In such embodiments, operation of the device takes place at a temperature equal to or lower than the electrophoretic separation temperature.

In some embodiments, the separator is a material that is cross-linked or otherwise rendered rigid during or after electrophoretic separation. For example, a polymer that is UV-curable or chemically curable or thermosetting is used as the liquid medium, optionally with a solvent. Polymerization is effected during or after electrophoretic separation has occurred. In some instances, the separator is a binder material that is not itself ionically conductive, but is infused with electrolyte after separation. As a non-limiting example, for a non-aqueous battery, a polymer binder such as polyvinylidine fluoride (PVDF) is dissolved in a compatible solvent, such as acetone or N-methyl pyrolidinone (NMP) or gamma-butyrolactone, forming a solution in which electrophoretic separation is effected. Following drying, the device is infused with an organic liquid electrolyte. Such porous or infusible binders also include inorganic substances such as a sol-gel derived oxide, or an organic-inorganic hybrid.

In addition to the electrophoretic deposition of materials, in certain embodiments the electrochemical deposition of materials from a fluid medium is also used. For example, in some instances metal or salt ions in liquid solution are deposited under applied electrical potential in order to deposit an ion storage compound or conductive additive at an electrode of an electrochemical device. In certain embodiments, the electrophoretic deposition of particles or electrochemical deposition of compounds is increased by replenishing the fluid medium during deposition, for example by repeated infiltration by the fluid or effecting continuous flow of the fluid through the device undergoing deposition.

In certain embodiments, electrical potential is applied to repel a first active material (and optionally additives having the same sign of electrophoretic mobility) from a second electrode that has a three-dimensional structure defining a pathway or void space therein. The electric field repels the first active material from the second electrode, thereby concentrating the first active material in the void space of the second electrode. In at least some such embodiments, the process of electrostatic repulsion substantially densifies the first active material, causing it to form an electrically continuous electrode. This continuous electrode, electrically connected to a first terminal or current collector, is then the first electrode of the device. By limiting the volume available to the electrophoretically mobile particles, a densely packed network of the first active material is formed, while electrical separation is maintained between the two electrodes.

In some instances, the second electrode is a porous electrode. In certain embodiments, the porous electrode is a reticulated open-cell foam. Such foams are available in materials including carbon, various metals and ceramics. These materials are easily machined into arbitrary shapes, useful for fabricating batteries of complex nonstandard form factors. One non-limiting example of a useful porous electrode is a continuous carbon structure having substantial open porosity, such as a carbon foam or carbon fiber mat. In particular embodiments, a carbon foam is used as an anode network to form a three-dimensional lithium ion battery. The pore space within the carbon foam is infiltrated with a cathode particulate network that is electrophoretically separated from the carbon structure to form the device. In specific embodiments, the carbon anode foam is infiltrated with a suspension containing a cathode active material, a polymer, and optionally additives. The cathode suspension is infiltrated into the anode carbon foam at elevated temperature. An electrical potential is applied so that the cathode material is repelled from the anode foam. Because the cathode suspension resides in a confined volume and cannot exit the sample, the particles are electrophoretically concentrated in the pore space of the foam, forming a continuous, interpenetrating network of the positive electrode material. This electrophoretically separated structure is fixed by cooling the system to solidify the polymer while still applying the electrical potential. In some alternative embodiments, the cathode suspension contains a solvent, and the structure is fixed by drying the solvent, rather than heating and subsequent cooling of the polymer. In some embodiments, the infiltration of the porous electrode by the suspension is expedited by carrying out infiltration with a pressure gradient across the porous electrode, or by applying a vacuum to a porous electrode immersed in a suspension, thereby removing trapped gas in the porous electrode. In certain embodiments, the drying of the infiltrated porous electrode is expedited by heating, application of vacuum, or both.

Figure 3:
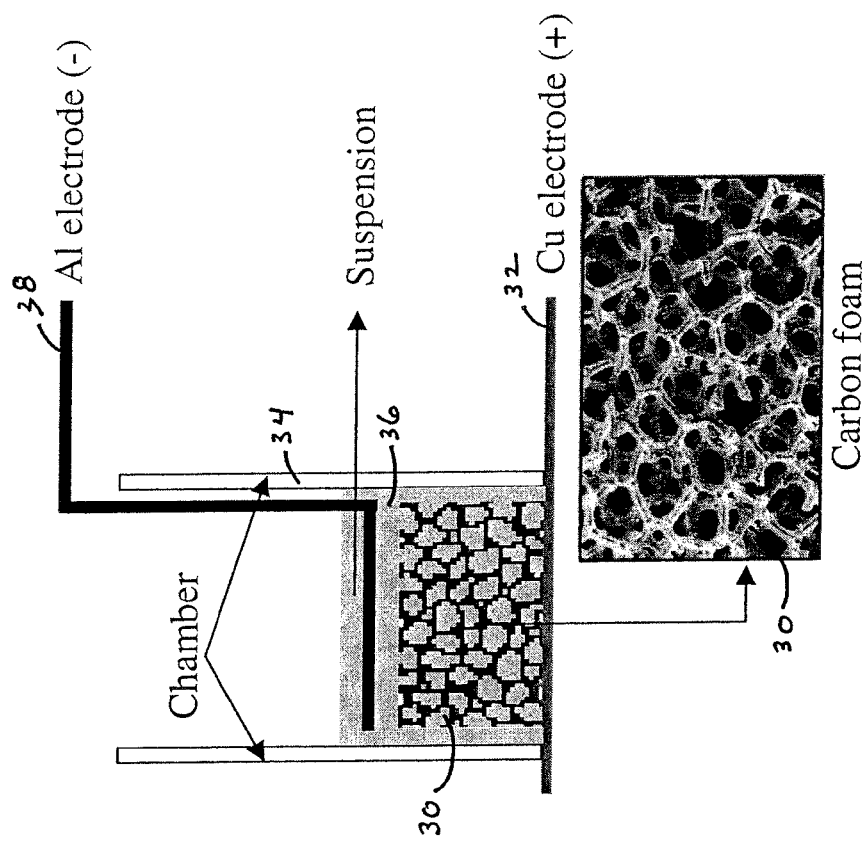
FIG. 3 is a schematic illustration of a system for spatially concentrating a cathode material in the pore space of a porous foam anode using electrophoresis according to certain embodiments.

FIGS. 3 and 4 illustrate an exemplary arrangement for a three-dimensional concentrating electrophoretic method using a carbon foam anode, as described in more detail in Example 2 below. Referring to FIG. 3, a carbon foam anode 30 is connected to a copper current collector 32, and a cylindrical container 34 is placed around the foam 30. A suspension 36 containing polymer and cathode material is poured into the container 34 and allowed to infiltrate the foam 30. An aluminum current collector 38 is connected to the cathode suspension 36 without contacting the foam 30. In some alternative embodiments, the current collector 38 is another suitable material, such as platinum, instead of aluminum. A voltage is applied between the copper 32 attached to the foam 30 and the aluminum current collector 38, with the aluminum current collector 38 at negative potential and the copper 32 at positive potential. Upon application of the voltage, as shown in FIG. 4, cathode particles 40 are concentrated into the pore space 42 of the foam 30. Simultaneously the cathode suspension 36 is electrophoretically attracted to the upper current collector, where it forms a good electrical contact. This process can be directly monitored by observing current flow between the current collectors; electrical isolation between the two electrodes is seen as the decay of current to negligible values. Upon cooling (or otherwise solidifying the polymer), the electrophoretically separated configuration is fixed in the final device.

In some alternative embodiments, a liquid electrolyte cell is prepared. In this case, a solvent is employed, for example, that can dissolve polymer binders or gel network formers. To complete the electrochemical cell, the electrophoretically separated system is dried and infiltrated with a standard liquid electrolyte. Since most particulate materials can be induced to have a surface charge in appropriate liquids, this approach is applicable to a wide range of active materials. The identification of a suitable system is illustrated in Example 4 below. Exemplary alternative arrangements for a three-dimensional concentrating electrophoretic method using a reticulated foam electrode include those described in Example 6 below. In some alternative embodiments, the stationary porous network is the positive electrode material, and the infiltrant a suspension of negative electrode material.

In certain embodiments, electrophoretic methods are used to produce devices in which it is desirable to have a high volume fraction of active materials, e.g., storage batteries. In at least some such embodiments, due to electrophoretic assembly, the volume available within the fabricated device is predominantly occupied by the active materials, with only a minority of the volume occupied by a fluid phase. As a non-limiting example, a device is assembled using a suspension of particles of a first active material in a fluid phase or phases including a binder or a polymer electrolyte, optionally combined with a solvent. Electrophoretic separation is effected by applying an electrical potential between first and second electrodes or terminals of the device, causing the second electrode to repel the particles of the first active material. In some embodiments, particles are deposited at one electrode, and an insulating layer of material is electrodeposited at the opposite electrode. The electrophoretically separated device structure is preserved, for example, by cooling the device, removing the solvent by drying, or crosslinking the binder or polymer by thermal, chemical, or radiative means (e.g., using a UV crosslinkable polymer) while still applying the electric potential. In this manner, a thin but electronically insulating separation is obtained between the two electrodes. Electrochemical function is then available, or becomes available upon infusion of an electrolyte into the device. The electrolyte infuses the space between the electroactive materials, and in at least some instances also infuses pore space within the electroactive materials. When a binder is present between the electroactive materials, the electrolyte infuses the available pore space unoccupied by the binder, and in at least some instances is partially absorbed by the binder itself.

The electrophoretic assembly methods described herein are especially useful for fabricating three-dimensional interpenetrating device architectures, in which reliable electrical separation between two high surface area interpenetrating electrodes can be difficult to achieve. Such structures include, but are in no way limited to, the porous foam electrode structures described in Example 2 below. Electrophoretic assembly as described herein provides an alternative to coating the internal surfaces of an anode foam with a thin layer of a separator material, and then infiltrating the remaining pore space with a cathode particulate suspension, as described in U.S. patent application Ser. No. 10/206,662, published as U.S. 2003/0099884 A1.

Electrophoretic assembly methods as described herein are also useful in producing standard battery architectures. By way of non-limiting example, primary batteries of cylindrical form factor typically have a bobbin construction, in which the anode (e.g., made of powdered zinc) is a central post, and the cathode (e.g., made of manganese oxide and other constituents) forms an outer bobbin. According to conventional methods, a continuous sheet of porous separator film is used to isolate the cathode and anode, and the whole is infused with aqueous electrolyte. Electrophoretic methods according to certain embodiments are useful for fabricating such batteries more simply and economically, to yield a cell having a greater volume fraction of storage materials, and therefore higher energy, than cells produced by conventional techniques.

In one embodiment, a battery of cylindrical form factor having a bobbin construction is assembled using electrophoresis. The battery has a central anode that serves as one working electrode for carrying out electrophoretic separation. A can housing the battery is filled with a suspension of cathode active material in a solvent that also contains a polymer solution or dispersion. A potential is applied so that the cathode active material is repelled from the central anode post and concentrated by electrophoretic forces. This repulsion and concentration of the cathode material causes the formation of a gap between the anode and cathode, which is filled by the solvent and polymer. The solvent is allowed to dry, and the polymer deposits between the anode and cathode, so that the anode and cathode remain electrically isolated without the use of a separate separator film. In some instances, the polymer also deposits within the electrodes and acts as a binder. The polymer and the formulations used are selected by methods well-known to those of ordinary skill in the art for leaving behind a porous separator layer. The battery is then infused with liquid electrolyte.

The following non-limiting examples further illustrate certain embodiments.

EXAMPLE 1

Figure 5:
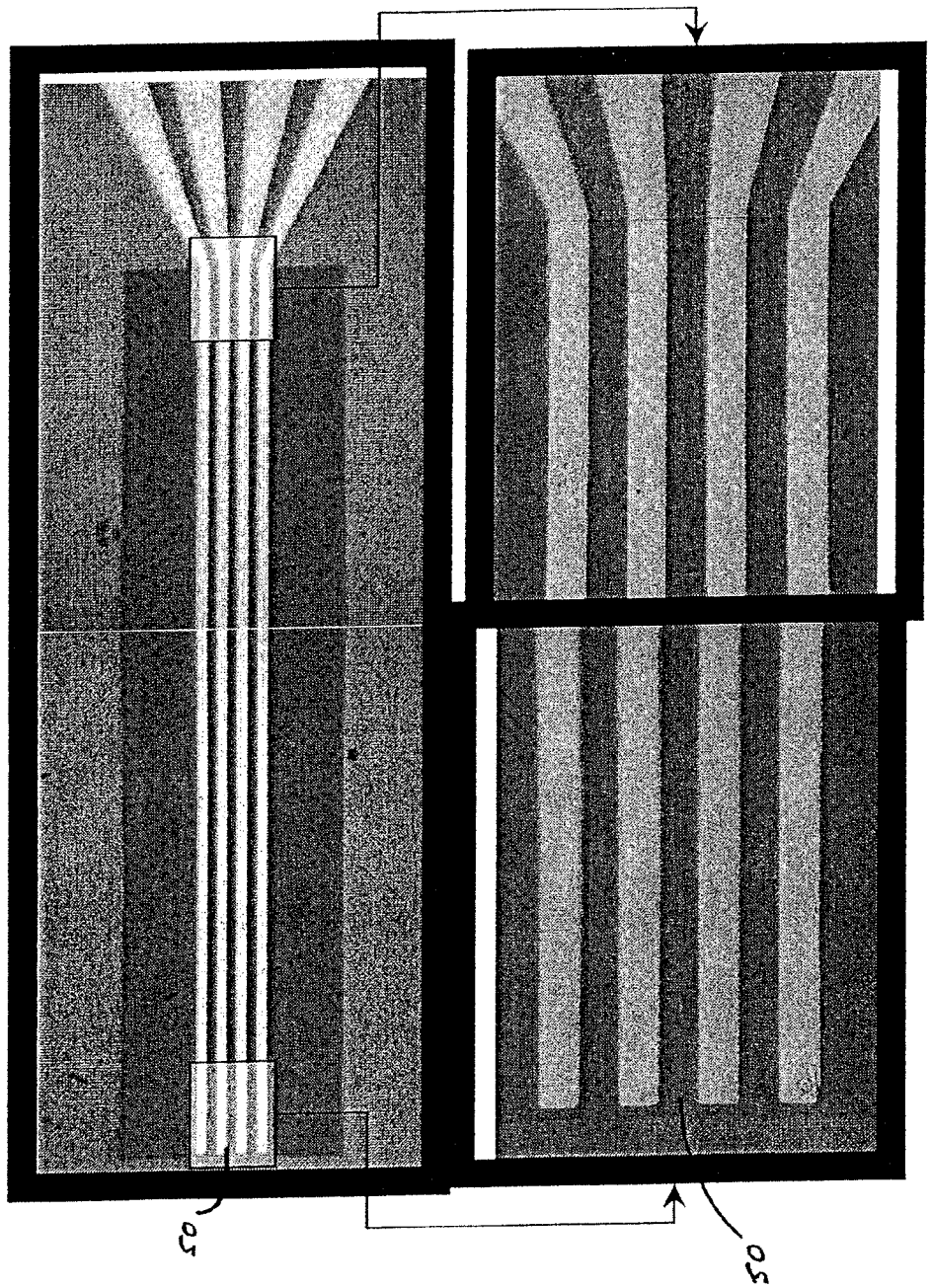
FIG. 5 is a top view of a microelectrode array deposited on glass, which is useful for carrying out electrophoresis according to certain embodiments.

The direction of electrophoretic migration was determined for several materials and solvent systems useful in batteries as follows. Measurements were made of the direction of motion of powders suspended in solvents between two gold working electrodes under an applied voltage. The gold electrode configuration was one of the following: (1) as shown in FIG. 1, two parallel films of gold 10, 11 sputtered on glass placed ~0.5 cm to ~1 cm apart in a small glass beaker 12 (20 ml or 30 ml) in which the suspension 14 was placed, (2) two sputtered gold electrode films 1 cm apart in a glass plate with a shallow well within which the suspension was placed, or (3) as shown in FIG. 5, individually addressable gold microband electrodes 50 (ABTECH Scientific, Richmond, Va.) deposited on glass, typically of 20 micron width and 20 micron separation, onto which a suspension was placed. For the microband electrodes, the polarity alternated between bands.

A powder suspension was prepared by placing the powder or powders of interest into a solvent, typically at a concentration of 1 mg of solid powder per 1 ml of solvent. A constant voltage (typically 3-10V) was applied to the electrodes, and then the suspension was placed into contact with the electrodes. After 10 min. to 30 min. for the first two electrode configurations, and 30 sec. to 5 min. for the microband electrodes, the deposition of powder was observed in order to determine the direction of electrophoretic migration. This allowed the subsequent selection of solid and solvent/polymer systems.

The solid powders tested included $LiCoO_2$ (Alfa-Aesar, Ward Hill, Mass.), mesoporous microbeads (MCMB) (Osaka Gas Co., Japan), Super P™ carbon (Timcal, Belgium), indium tin oxide (ITO) powder (Aldrich Chemical, Milwaukee, Wis.), and doped lithium iron phosphate from A123Systems (Boston, Mass.).

The pure solvents and solvent mixtures tested included the following:
1) acetonitrile
2) acetone
3) isopropanol
4) dimethyl formamide
5) acetonitrile with dissolved polyethylene glycol (PEG, 1500-8000 molecular weight) or polyethylene oxide (PEO, 200,000 MW) and $LiClO_4$
6) acetone with dissolved polyvinylidine fluoride (PVDF, 534,000 MW) and $LiClO_4$.

The following migration directions were observed. $LiCoO_2$ migrated toward the positive electrode in solvents 1 and 2, and toward the negative electrode in solvents 4, 5 and 6. MCMB migrated toward the positive electrode in solvent 2, and toward the negative electrode in solvents 1, 4, 5, and 6. Super P™ migrated toward the positive electrode in solvent 2, and toward the negative electrode in solvents 1, 5, and 6. ITO migrated toward the positive electrode in solvents 1, 2, and 5, and toward the negative electrode in solvent 3. $LiFePO_4$ migrated toward the negative electrode in solvent 5.

Experiments were also conducted to observed the direction of electrophoretic migration and deposition for several polymers commonly used in lithium ion battery systems. In pure acetone, polyvinylidene fluoride (PVdF) having a molecular weight of 60,000 (Polysciences Inc), and Kynar 461, a PVdF homopolymer (Atofina) were both observed to deposit on the positive electrode, indicating existence of a negative zeta potential. When $LiClO_4$ salt was added to acetone, however, the Kynar 461 did not exhibit migration under electric field, indicating that the zeta potential is readily compensated. Kynar 2801, a PVdF-HFP copolymer (Atofina) did not exhibit electrophoretic migration even in pure acetone, indicating negligible zeta potential. This demonstrates that combinations of materials can be readily selected in which a polymer constituent as well as particles of inorganic active materials are electrophoretically deposited or not. Electrodeposition of a polymer can serve useful functions such as being a binder for other particles or to provide an electronically insulating layer or "in-situ" separator layer.

These results allow for the selection of single materials or combinations of materials that will migrate to or from a given electrode under a certain applied voltage. For example, in solvent 5, which upon drying forms a solid polymer electrolyte, $LiCoO_2$ and Super P™ (as a conductive additive) migrate in the same direction, and can be co-deposited or co-aggregated to form an electrode. FIG. 1 illustrates the obtained result of $LiCO_2$ and Super P™ 16 co-depositing at one electrode 11. The same can be done with $LiFePO_4$ and Super P™ in solvent 5. The same co-deposited electrodes ($LiCoO_2$ and Super P™, $LiFePO_4$ and Super P™) can be formed in solvent 6. In this instance, the solution of solvent with PVDF and $LiClO_4$ (or solvent and PVDF alone) will dry to form a binder that can be infused with a liquid electrolyte.

Examples of layered or laminated battery cells made using electrophoretic deposition and simultaneous separation are shown in FIGS. 2A-B. As illustrated in FIGS. 2A-B, electrophoretic deposition of $LiCoO_2$ and Super P™ at one electrode can be used to simultaneously create an insulating gap between that electrode and the counterelectrode, which in this example is a lithium foil or carbon electrode, both selected to be capable of accepting lithium from the $LiCoO_2$ when the resulting cell is charged.

EXAMPLE 2

This example demonstrates the assembly of an electrochemical device using a continuous carbon structure having substantial open porosity, such as a carbon foam or carbon fiber mat, as one working electrode during electrophoretic processing. This porous electrode also becomes a working electrochemical storage electrode in the final device, which is a three-dimensional lithium ion battery.

Figure 6:
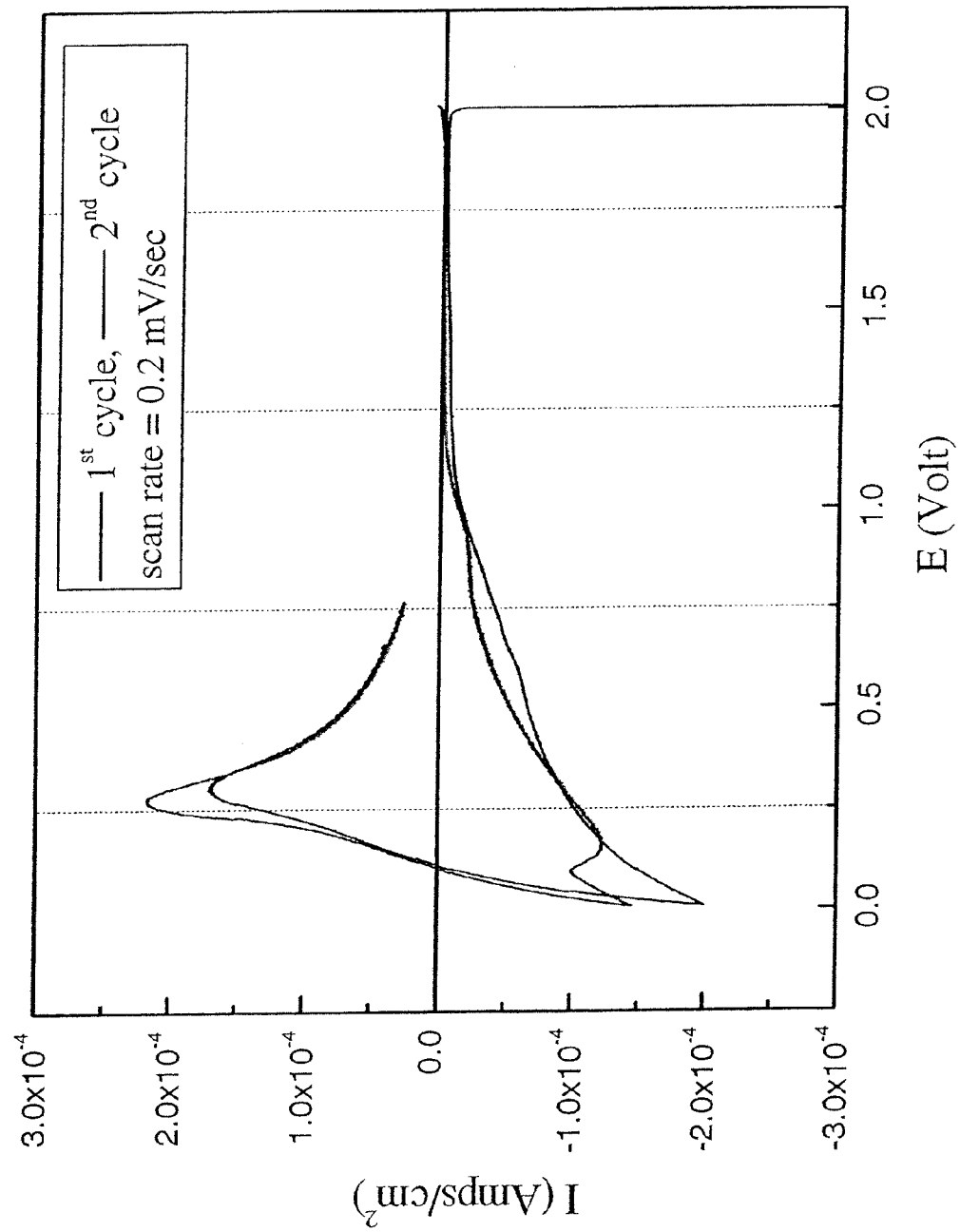
FIG. 6 is a chart showing a cyclic voltammetry scan of a heat treated carbon foam, tested in a Swagelok® cell against a lithium metal foil electrode, showing reversible electrochemical insertion of lithium at the expected potential for carbon anodes.

In one series of experiments, reticulated carbon foams (Duocel™, ERG Materials and Aerospace, Oakland, Calif.) having pore dimensions of between 45 pores-per-inch (ppi) and 100 ppi were used. In some cases, the carbon foam was fired to high temperature (2300° C. to 2400° C.) in helium in order to improve the electrochemical storage capability. FIG. 6 shows a cyclic voltammetry scan of a heat treated carbon foam, tested in a Swagelok® cell against a lithium metal foil electrode, showing reversible electrochemical insertion of lithium at the expected potential for carbon anodes.

The pore space within the carbon foam was then infiltrated with a cathode particulate network that was electrophoretically separated from the carbon structure in order to form the device. A cathode suspension was prepared from $LiCoO_2$, Super P™, acetonitrile, PEG or PEO, and $LiClO_4$. One typical formulation used was 5 ml acetonitrile, 0.6 g $LiClO_4$, 2.12 g PEG 1500, 3.2 g $LiCoO_2$, and 0.16 g Super P™.

FIG. 3 illustrates the configuration that was used for electrophoretic assembly. A cylindrical piece of foam 30 ~16 mm in diameter by ~10 mm in height was attached to a copper current collector 32 with good electrical contact. A cylindrical container 34 (polypropylene or Teflon® (polytetrafluoroethylene, DuPont, Wilmington, Del.)) was placed around the foam. The cathode suspension 36 was mixed uniformly, poured into the container 34, and allowed to infiltrate the foam 30. The container 34 was filled with a sufficient volume of the cathode suspension 36 to fill the foam 30, leaving some excess to which an aluminum foil current collector 38 was connected at the top of the sample without contacting the carbon foam 30. Cross-sections of an infiltrated sample showed penetration throughout the foam 30 by the $LiCoO_2$ and Super P™.

A 10V potential difference was applied between the copper 32 attached to the carbon foam 30 and the aluminum current collector 38. The aluminum current collector 38 was at negative potential and the copper 32 at positive potential. The sample was placed in a vacuum oven and heated to 100° C., at which time a vacuum was applied to speed up drying of the sample. The current between the two electrodes was observed, and decayed to negligible values. The sample was then cooled to room temperature and removed from the oven.

After cooling, the dc resistance between the copper and aluminum current collectors 32, 38 was >20 Mohms (measurable value being limited by the multimeter used). As shown in FIG. 4A, the $LiCoO_2$ and Super P™ particulates 40 were electrophoretically repelled from the carbon anode 30 and attracted towards the aluminum current collector 38, but remained trapped within the porosity 42 of the foam 30. Thus, the cathode active material 40 and the anode network 30 were electrophoretically separated from one another. FIG. 4B shows an expanded view of the infiltrated foam.

Figure 7:
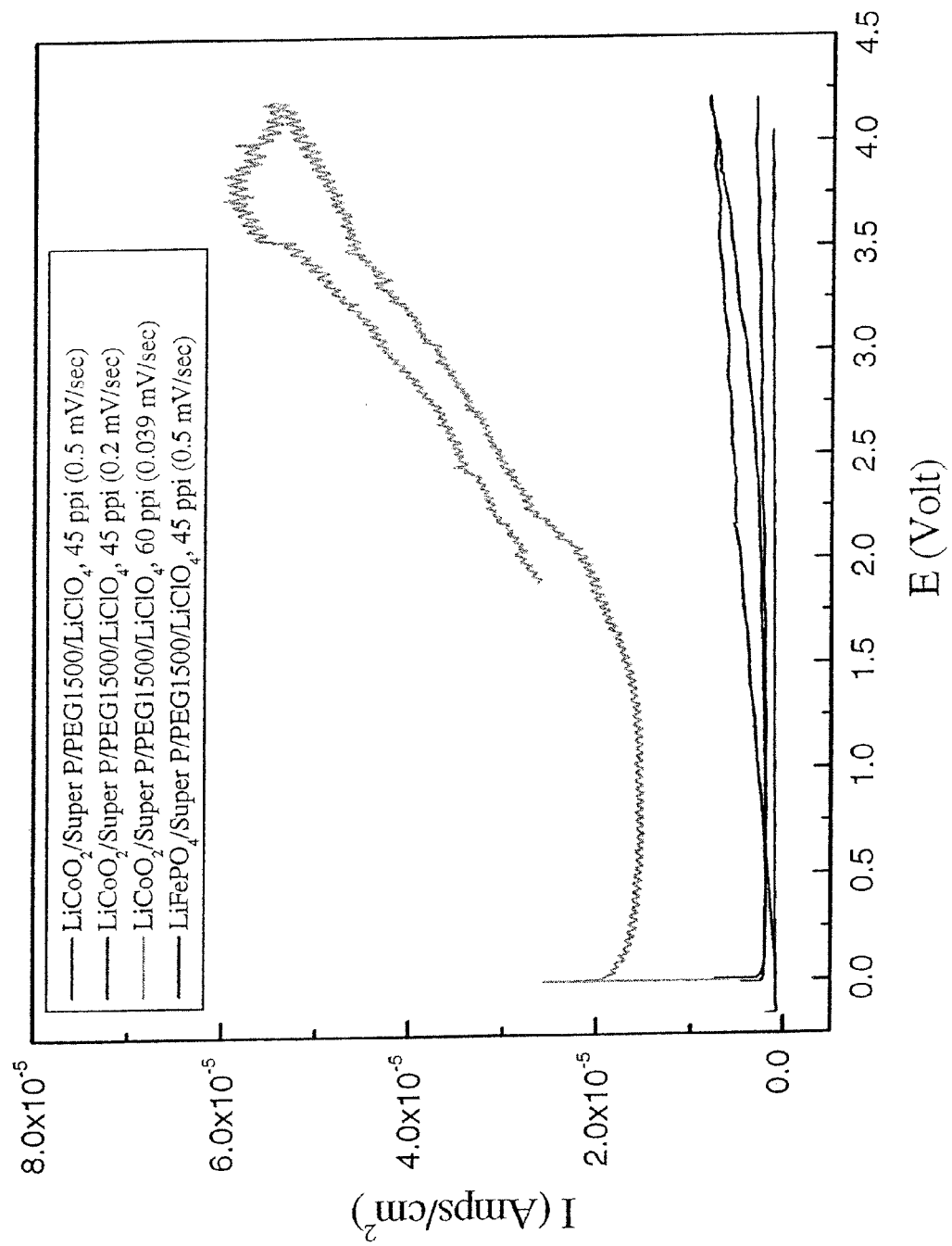
FIG. 7 is a chart showing cyclic voltammetry results from several samples of devices assembled by electrophoresis according to certain embodiments. Testing was performed at various scan rates between 0 and 4.2V at room temperature. In each case, the sample resistance remained high up to the maximum voltage, showing that electrical insulation was preserved.

Cyclic voltammetry (CV) was performed to further demonstrate that the cathode and anode remained electrically isolated up to high voltages characteristic of lithium ion battery systems. FIG. 7 shows CV results from several samples tested at various scan rates between 0 and 4.2 V at room temperature. In each case, the sample resistance remained high up to the maximum voltage, showing that electrical insulation was preserved. FIG. 7 also shows CV results for a sample made using a suspension containing $LiFePO_4$ and Super P™ as the solid phases, demonstrating that electrical isolation was achieved using this suspension as well.

EXAMPLE 3

Figure 8:
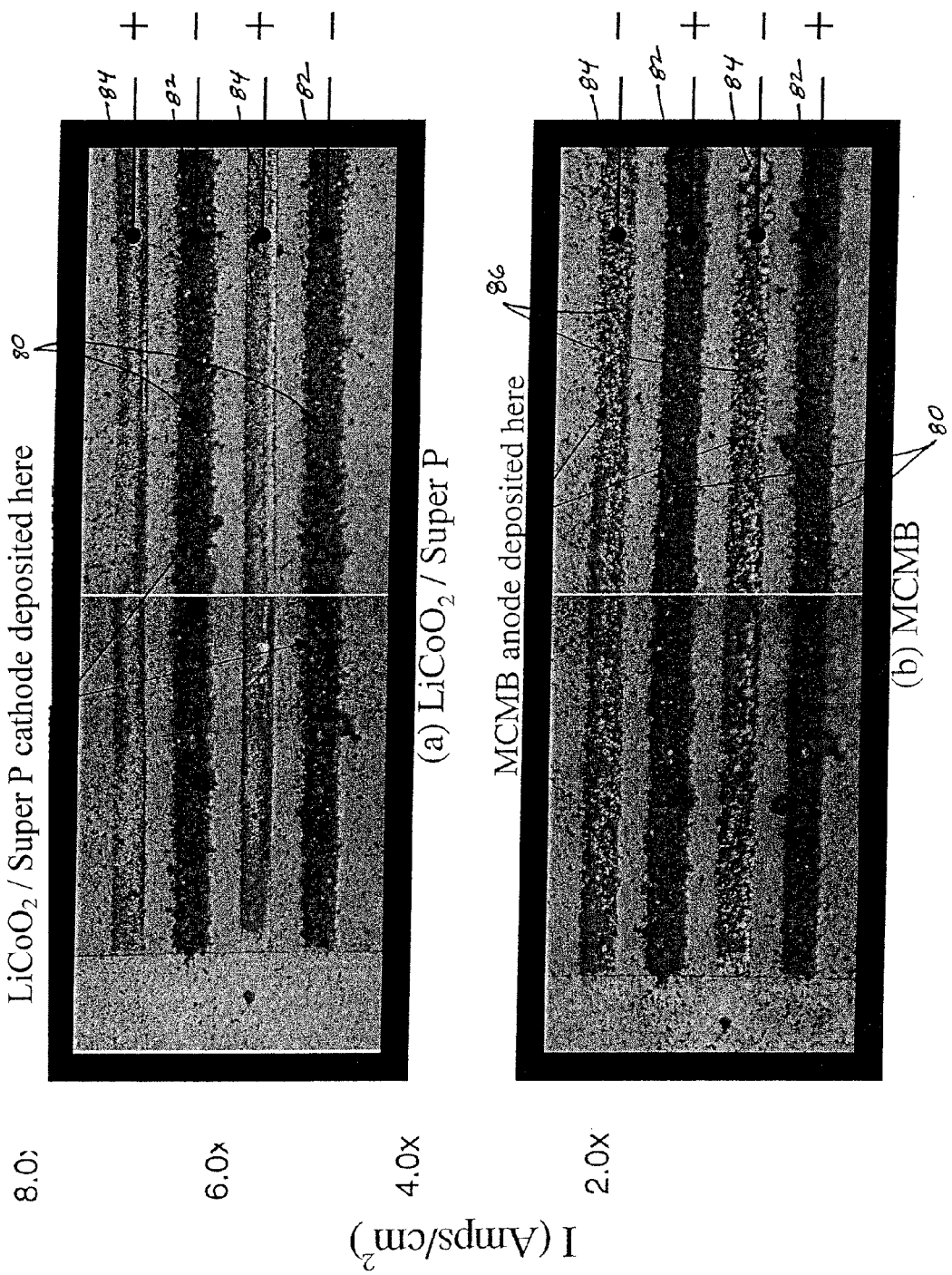
FIG. 8A is a top view of a microelectrode array with $LiCoO_2$ and Super P™ carbon electrophoretically deposited at one electrode according to certain embodiments.
FIG. 8B is a top view of a microelectrode array with $LiCoO_2$ and Super P™ carbon electrophoretically deposited at one electrode and mesoporous microbeads (MCMB) electrophoretically deposited at the other electrode according to certain embodiments.

A two-dimensional electrophoretically separated device was fabricated using the following procedure. A 20 micron width microelectrode array 50 deposited on glass (ABTECH Scientific, Richmond, Va.) as shown in FIG. 5 was used. A suspension of $LiCoO_2$ and Super P™ powder in acetonitrile, PEO 200,000, and $LiClO_4$ was prepared using the same ratios as in Example 2, and the suspension was then further diluted with additional acetonitrile. The suspension was applied to the microelectrodes and a 1 volt potential difference was applied to the array. As shown in FIG. 8A, deposition of the $LiCoO_2$ and Super P™ 80 at the negative electrodes 82 was observed, with no detectable deposition at the positive electrode 84.

Next, a suspension of MCMB in the same solvent mixture was applied, with the voltage being applied as shown in FIG. 8B. MCMB was found, like $LiCoO_2$ and Super P™, to migrate to the negative electrode in this solvent mixture. Therefore, in order to deposit MCMB 86 at the opposite electrode 84 from the $LiCoO_2$ and Super P™ 80, the voltage was reversed from that used to deposit the $LiCoO_2$ and Super P™ 80. It was observed that MCMB 86 deposited at the opposite electrode 84 from the $LiCoO_2$ and Super P™ 80 as expected.

After deposition and drying, electrical measurements showed a >20 Mohm resistance between the two deposited electrodes. Thus, electrophoresis was used to fabricate a two-dimensional battery array consisting of interpenetrating electrode structures, with electrical isolation between the two. The intervening space between the electrodes can be filled with PEO and $LiClO_4$ solid polymer electrolyte, or infused with liquid electrolyte.

EXAMPLE 4

As in Example 2, a Duocel™ non-graphitizing reticulated vitreous carbon foam was used as a stationary electrode. The foam had linear pore-per-inch (ppi) counts of 45, 60 and 100, and a bulk density of 0.05 g/cm³. The as-received reticulated carbons were heat treated in a graphite resistance-heated furnace (Astro Corp., Santa Barbara, Calif.) at 2400° C. for 4 hours in He gas in order to improve their lithium storage capacity. A copper current collector was attached to a cylindrical sample of the reticulated carbon (16 mm in diameter by 10 mm in height), forming a negative electrode structure that was placed within a close-fitting polypropylene container. Aluminum foil or platinum mesh was used as a working electrode/current collector on the positive electrode side, as illustrated in FIG. 3. The cell was infiltrated with a suspension of cathode active material, $LiCoO_2$ and Super P™ carbon, in binder and solvent. After infiltration, which occurred on the time scale of seconds to minutes, a voltage of 10 volts was applied across the two current collectors to effect electrophoretic separation of the cathode active material from the stationary anode, as illustrated in FIG. 4. To complete the electrochemical cell, the electrophoretically separated system was dried and infiltrated with a standard liquid electrolyte.

Cell balancing was then taken into account in selecting a specific suspension formulation. The $LiCoO_2$ concentration in the suspension was chosen to yield a slightly cathode-deficient composition in the final cell, i.e., one in which the lithium ion source is cathode-limited, in order to avoid lithium metal precipitation at the negative electrode during charge. A typical suspension formulation in weight percentage was 69.3% acetone, 3.5% $LiClO_4$, 8.7% PVDF (66,000 MW), 17.3% $LiCoO_2$, and 1.3% Super P™. Taking the components of the electrode formulation alone, the weight proportions were 31.8% PVDF, 63.5% $LiCoO_2$, and 4.8% Super P™, which is binder-rich compared to typical cathode formulations, but useful for cell balancing.

Cell infiltration and electrophoretic forming was conducted as follows. A quantity of the $LiCoO_2$ suspension sufficient to completely infiltrate the anode framework and contact the upper working electrode was poured into the cell. The cell was placed in a vacuum chamber at room temperature, and evacuated to facilitate infiltration of the suspension into the reticulated carbon. After infiltration, a 10V dc voltage was applied across the two current collectors. Due to the positive zeta potential of the particles, the negative potential appears at the current collector to which the $LiCoO_2$ and Super P™ are attracted (FIGS. 3 and 4). Relative to the final operation of the lithium ion battery, this is the polarity used for discharging. The large overpotential results in an initially "overdischarged" state of the cell, as shown below. The infiltrated cell was held at 10V dc voltage for a total of 6 hours, the first 2 hours at room temperature, and the following 4 hours at 45° C. to complete drying. During electrophoretic forming, the current dropped to <4 mA over a period of about 2 hours, and after drying, the dc resistance between the current collectors after electrophoretic forming was >10 MΩ. Control experiments conducted without the applied voltage showed complete electrical shorting between the current collectors, confirming that the electrical isolation was due to electrophoresis. Upon drying, the space between the positive and negative electrodes was occupied by the PVDF binder, acting as a porous separator. The cell was then flooded with liquid electrolyte (1:1 ethylene carbonate:diethyl carbonate (EC:DEC) mixture with 1 M $LiPF_6$) in an argon-filled glove box, and subjected to electrochemical testing.

Figure 9:
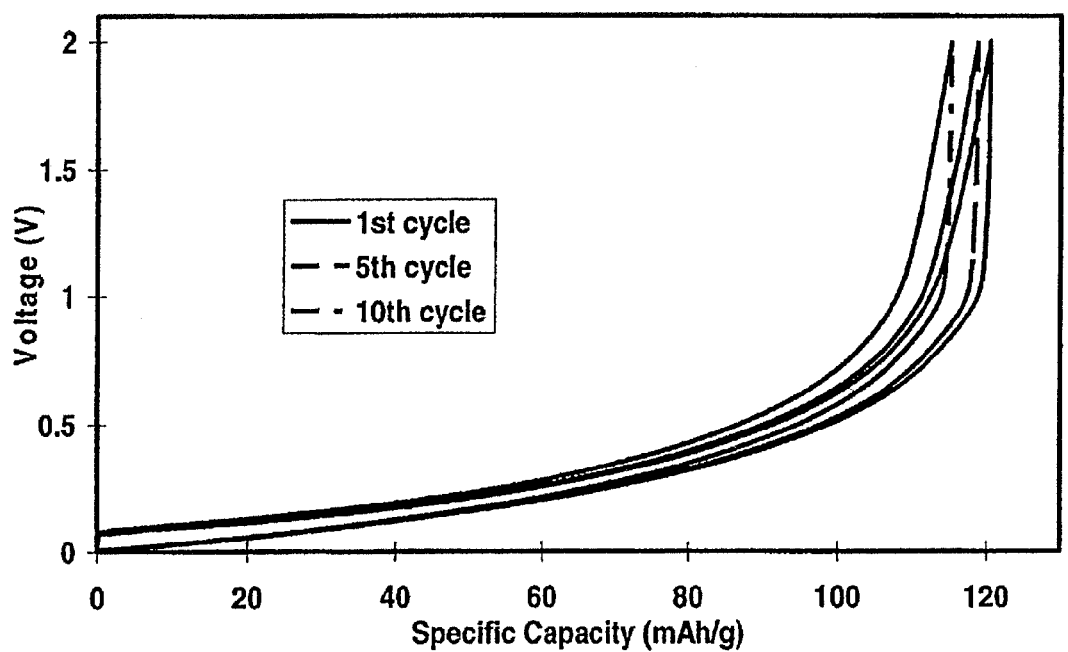
FIG. 9 is a plot illustrating galvanostatic cycling (30 mA/g) vs. lithium metal of reticulated vitreous carbon, fired at 2400°

Electrochemical test results were carried out for the reticulated carbon in a Swagelok® design lithium half-cell. The as-fired reticulated anode was crushed in a mortar and pestle and formulated with PVDF binder as an electrode coating, then assembled in the cell using lithium metal foil as the counterelectrode and Celgard® 2400 (Celgard Inc., Charlotte, N.C.) as the separator membrane. FIG. 9 shows galvanostatic testing at 30 mA/g current rate between 0 and 2V. The first-cycle irreversible capacity loss of the carbon was extremely low, and there was only ~4% capacity fade over 10 cycles. Due to the half-cell configuration, any lithium consumed in passivating the carbon was not detected, but would be present (several percent first cycle capacity loss) in a lithium-ion configuration. The carbon gravimetric capacity of 120 mAh/g was considerably less than that of optimized graphite anodes (typically ~350 mAh/g). The lithium storage capacity of carbons is known to vary widely; in this instance the lower capacity may have been due to the dense nature of the amorphous carbon and the relatively thick cross-section of the struts in the reticulated structure of about 50 μm. This may be too large a cross-section to allow complete lithiation at the current rates used. For comparison, the particle diameter of a typical optimized graphitized MCMB (mesocarbon microbeads) anode is less than 25 μm. Nonetheless, taking the gravimetric capacity of the carbon to be 120 mAh/g, the $LiCoO_2$ suspension was formulated to provide a cathode-limited cell. The reticulated carbon samples used had a mass of ~0.1 g, providing a capacity of 12 mAh. The $LiCoO_2$ suspension composition yielded, after infiltration and drying, a cathode active mass infiltrated within the reticulated foam of ~0.072 g. Given a typical $LiCoO_2$ gravimetric capacity of 140 mAh/g, the positive electrode capacity was then 10.1 mAh.

The first galvanostatic (C/24 rate) charge-discharge cycle of a completed cell is shown in FIG. 10A. The open circuit voltage of the cells after assembly and drying, and even after filling by electrolyte, was negative (~−1V after filling). Upon charging however, the potential immediately became positive, as seen in FIG. 10A. The first-charge curve (to 4.1V) was noisy and exhibited a larger capacity (275 mAh/g based on cathode active mass) than could be provided by the $LiCoO_2$ present. In the first discharge, however, the voltage profile was typical for a $LiCoO_2$/carbon couple, exhibiting an average voltage of ~3.8V, and showing a discharge capacity that when evaluated on the basis of the $LiCoO_2$ mass infiltrated into the cell was ~100 mAh/g. The first discharge capacity in lithium ion cells is always lower than the first charge capacity due to coulombic inefficiencies such as irreversible consumption of lithium in forming the solid-electrolyte interphase (SEI) on the carbon, and other side reactions. Nonetheless, the observed discharge capacity shows that at least 70% of the infiltrated $LiCoO_2$ was electrochemically accessible.

Figure 10:
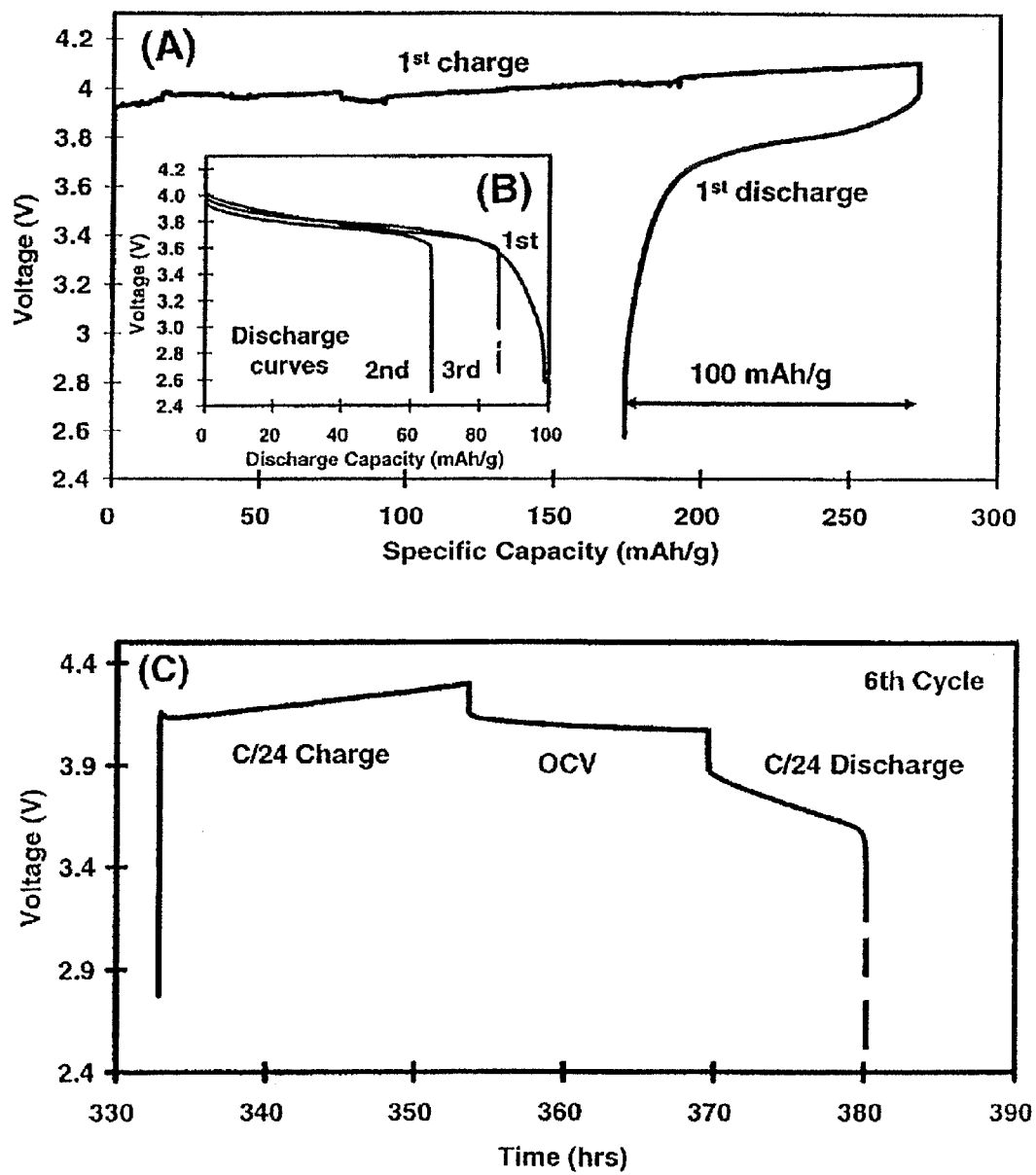

FIG. 10B shows discharge curves for the first few cycles exhibiting similar voltage profiles, with the capacity varying with upper voltage limit during charge. The first and second cycles were charged to 4.1V limit, and the third cycle to 4.2V. The sharp drop in voltage near the end of discharge for the second and third cycles was due to incomplete charging during their respective charge cycles. FIG. 10C shows the sixth charge/discharge cycle, in the middle of which a 16 hour hold at zero current was conducted, showing that the open circuit voltage (OCV) stabilized at about 4.1 V. FIG. 10C also shows that there was a significant polarization of ~0.2V upon charge and discharge about the equilibrium voltage. This limits the state of charge during continuous cycling; as seen in FIGS. 10A and 10C, the charge curve did not terminate with a sharp rise in voltage. (The system was not charged to higher voltages than 4.3V in order to prevent electrolyte decomposition.) The discharge capacity curves after the first cycle, seen in FIGS. 10B-C, showed a sharp drop-off in voltage that was consistent with incomplete charging, whereas the first discharge showed a gradual roll-off consistent with lithiation of the carbon anode to near its capacity limit (FIG. 9). Other cells prepared similarly to the one reported in FIG. 10 behaved similarly.

Thus, these cells showed complete electrochemical functionality: they held an open circuit voltage, and charged and discharged reversibly with substantial utilization of the active materials contained within. Defining the basic "cell" to be all components contained within the volume defined by the reticulated carbon sample (i.e., excluding the current collectors, excess slurry, and container), the first-discharge capacity data in FIG. 10B corresponds to a cell gravimetric energy density of 120 Wh/kg. This may be compared with the theoretical upper limit of 386 Wh/kg for a perfectly capacity-balanced $LiCoO_2$-graphite system with no inactive materials, and ~140 Wh/kg for currently available lithium ion cells.

EXAMPLE 5

This example describes a three-dimensional interpenetrating electrode nickel-metal hydride battery. Nickel metal foams are available, and suitable for use as the stationary electrode, as described in Example 4, for electrophoretic fabrication of an aqueous electrolyte, nickel metal-hydride battery. A nickel metal foam is infiltrated with a suspension of particles of its counterelectrode and optionally conductive additives, which are suspended in an organic solvent or aqueous solution, including soluble binders. The zeta potentials of the particle phases are measured or controlled through the methodology described in Example 4. After electrophoretic separation and drying, the cell is infiltrated with an aqueous electrolyte, e.g., containing KOH, completing the battery.

EXAMPLE 6

This example describes the use of a can in which a three-dimensional interpenetrating electrode battery is packaged as the working electrode for electrophoretic separation. FIGS. 11A-B show two such cell designs. In FIG. 11A, a reticulated foam 110 is electrically connected to a current collector (tab) 112 exiting the conductive metal can 114, and isolated from the metal can 114 by insulating materials 116 such as o-rings, gaskets or sheets of insulating film or fabric. Upon infiltrating the can 114 with a counterelectrode suspension, a potential is applied between the can 114 and the current collector 112 so as to attract the suspension particles to the can 114 and repel them from the foam 110. The polarity shown corresponds to the materials described in Example 4, where the foam 110 is carbon and the infiltrating suspension contains $LiCoO_2$ and Super P™. Thus, the suspension particles are attracted to the metal can 114 and repelled from the carbon foam 110. Suitable materials for the can 114 in this instance include aluminum and other metals stable at the positive electrode potentials in a Li-ion cell. The top current collector 112 connected to the carbon foam 110 is copper or another metal stable at the negative electrode potential.

An alternative construction is shown in FIG. 11B, in which the foam 110 is electrically connected to the can 114, while the current collector 112 is electrically isolated by the insulator 116 from the foam 110. In this case, the polarity is reversed from the case illustrated in FIG. 11A.

EXAMPLE 7

Electrophoretic assembly of a 3D battery was carried out in the configuration shown in FIG. 17. The cathode formulation consisted of acetone (6 g), PVdF (0.1 g), $LiCoO_2$ (0.2 g), and Super P (0.01 g). A lower current collector consisting of Pt mesh was placed onto the bottom of a 10 mL beaker. A cylindrical piece of reticulated carbon foam (60 ppi) of ~16 mm diameter by ~3 mm height was attached to a second Pt mesh current collector, and placed above the first Pt mesh current collector, as shown in FIG. 17, such that they were separated by ~1 mm. The cathode suspension, which has a low viscosity, was added so that it filled the vessel well above the upper Pt mesh current collector attached to the carbon foam. A dc voltage was then applied between the upper and lower Pt mesh current collector, with the lower current collector at positive potential and the upper at negative potential. FIG. 18 shows the current measured between the two current collectors as a function of time, for two values of applied voltage. At 4.2V, the current remains significant (>0.5 mA) even after 3 hours. However, at 10V, the current drops rapidly and is below 0.1 mA after 4 h, effectively showing electrical isolation. This assembly, after drying and infiltration with liquid electrolyte as in Examples 2 and 4, shows lithium ion battery functionality.

EXAMPLE 8

This example describes the use of bridging between two electrophoresis electrodes to form a single battery electrode. FIGS. 12A-B shows the two step deposition process for the electrophoretic assembly of a battery. In the first step, a set of 4 electrodes (Abtech Scientific, microband electrodes: 10 microns wide, 20 microns pitch, 3 mm in length) were submerged into a mixture containing acetone as a solvent, 2.8 wt % MCMB carbon (5-8 micron, 6-28, Osaka Gas Co.) and 0.55 wt % polymer (Kynar 2801). A potential of 5V was applied between the pair of electrodes on the left in FIG. 12A for 20 seconds and then the microband was removed from the solution with the voltage still being applied. As observed in FIG. 12A, the carbon deposited as to bridge between the two electrodes. In the second step, the same set of electrodes were submerged into a mixture containing acetone as a solvent, 6 wt % $LiCoO_2$ (Seimi, spelling?) and 0.46 wt % polymer (Kynar 2801). The mixture was allowed to settle for 3 hours, effectively decreasing the particle concentration in the mixture. A potential of 5 V was applied between the pair of electrodes on the right in FIG. 12B for 3 minutes and then the microband was removed from the solution with the voltage still being applied. The sample was then immersed in a liquid electrolyte consisting of a mixture of ethylene carbonate and dimethyl carbonate with 1M $LiPF_6$. FIG. 13 shows the charge and discharge for cycle number 40 for the battery pictured in FIGS. 12A-B. The battery was charged at 5 nanoAmperes to 4.2V and discharged at the same current to 3V. The typical charge time was 550 seconds and typical discharge time was 400 seconds and at cycle 40 the battery had a capacity of 1.7 nAh.

An alternative mixture was made to demonstrate that $LiCoO_2$ can also be electrophoretically deposited by bridging. FIGS. 14A-B show the two-step process to make a battery by electrophoretic deposition on a set of four electrodes (Abtech Scientific, microband electrodes: 20 microns wide, 40 microns pitch, 3 mm in length) where both of the battery electrodes are deposited by bridging. In the first step, the electrodes in FIG. 14A were submerged in a mixture of 1-2 micron carbon (5 wt %) and acetone (no polymer) with a potential of 4V applied the right set. In the second step, the electrodes in FIG. 14B were submerged in a mixture containing acetone as a solvent, 9 wt % of $LiCoO_2$ and 5 wt % polymer (PVdF, 60,000 MW). The mixture was not allowed to settle before electrophoretic deposition. Electrophoretic deposition was performed at 4V for 5 seconds and bridging of the $LiCoO_2$ is observed in FIG. 14B.

EXAMPLE 9

This example describes the dependence exhibited of the electrode on which particles with the absolute voltage and electric field between the electrodes. FIGS. 15 A, B and C show the deposition from a mixture of 1 wt % $LiCoO_2$ in acetone at 2, 2.5 and 3V, respectively, on 20 micron wide Pt electrodes with 20 micron gaps. This corresponds to electric fields between the electrodes of 1000, 1250 and 1500 V/cm, respectively. At these potentials and fields, the direction of deposition follows the measured zeta potential, in that the particles deposit on the positive electrode. Additionally, these figures show that particles deposit on the electrodes at low voltage and field (FIG. 15A) and bridge across electrodes at higher voltage and field (FIGS. 15B,C and 16A,B and C). FIGS. 16 A, B and C shows the deposition observed at a higher voltage of 5V (field of 2500 V/cm) from a similar mixture and on similar electrodes. At this higher potential and field, the $LiCoO_2$ particles deposit at the negative electrode. The change in the direction of particle deposition is due to combined effects of electrochemical reactions occurring at higher voltages and magnitude of the field. Similar behavior showing a switch in the electrode of deposition with increasing voltage and electric field was also observed MCMB carbon particles.

EXAMPLE 10

A pattern of terminals is formed on a flat or curved surface, said pattern having an interdigitated, serpentine, or spiral configuration, and thereby allowing formation of a battery using the methods of Examples 3, 8 and 9. FIGS. 19 and 20 show a serpentine and a spiral pattern, respectively. Depending on the width and separation of the terminals, and the particle size of the deposited material, batteries in which the electrode width and spacing are as small as a few nanometers can be fabricated. Larger dimensions from as submicrometer up to tens or hundreds of micrometers can also be fabricated. Such batteries allow the creation of a 2-dimensional (in the case of a flat substrate) battery with a single set of terminals connecting to an external device, making more efficient use of the available area than a multiplicity of linear batteries as in Example 3, each separately connected to the external device. The height of such an array can vary considerably and can be as tall or even taller than the narrowest dimension of the pattern. That is, the height to width ratio of the deposited material can range from a very small value to over unity. This allows the total thickness (height) of such batteries to be controlled, and in some cases the thickness can be many micrometers. As such, the energy (mAh) per unit area of the substrate in such batteries can be much greater that those of solid-state thin film batteries, in which the deposited film thicknesses are typically a few micrometers or less.

EXAMPLE 11

This example is directed towards the fabrication of microscopic or nanoscopic "pinpoint" batteries, providing an unobtrusive power source of very small volume, typically less than 1 cubic millimeter; and, in some cases, less than 0.1 cubic millimeters. The methods of Examples 3, 8 or 9 are applied to a pattern of terminals in which only a very limited area of the terminal is exposed to the medium from which the electroactive material is deposited. Thus deposition occurs in a localized area on any suitable substrate, the specific dimensions of which are determined by the dimensions of the terminals and the deposited particles, suspension composition, and deposition conditions such as time, voltage, electric field, etc. The localized area may be, for example, less than 1 micron squared, less than 100 nanometers squared and, in some cases, less than 10 nanometers squared. FIGS. 21 and 22 illustrate configurations of terminals allowing such deposition, corresponding to the methods of Example 3 and 8 respectively. In FIG. 21, two terminals are provided, at each of which an electroactive material is deposited, resulting in a pair of electrodes comprising a device. In FIG. 22, four terminals are provided, and between each pair of terminals, deposition of particles limited by particle bridging is carried out, to create a pair of electrodes comprising a device.

As will be apparent to one of skill in the art from a reading of this disclosure, the present invention can be embodied in forms other than those specifically disclosed above. The particular embodiments described above are, therefore, to be considered as illustrative and not restrictive. The scope of the invention is as set forth in the appended claims, rather than being limited to the examples contained in the foregoing description.

What is claimed is:

1. A method of assembling a bipolar device including a first terminal and a second terminal comprising:
   providing the first terminal in a medium;
   providing particles of a first electroactive material in the medium;
   providing the second terminal in the medium, the second terminal electronically connected to a second electroactive material in the medium;
   generating an electric field causing the particles of the first electroactive material to form an electronically continuous first electrode while creating an electronically insulating separation between the first and second electroactive materials; and
   preserving the electronically insulating separation between the first and second electroactive materials.

2. The method of claim 1, wherein the electrical field is generated by applying an electrical potential between the first terminal and the second terminal.

3. The method of claim 1, wherein the electrical field is generated by applying an electrical potential between one of the first and second terminals and a third terminal.

4. The method of claim 1, wherein the electrical field attracts particles of the first electroactive material to the first terminal.

5. The method of claim 1, further comprising depositing particles of the first electroactive material on the first terminal.

6. The method of claim 1, wherein the electrical field attracts particles of the first electroactive material to the first terminal and repels particles of the first electroactive material from the second electroactive material in the medium.

7. The method of claim 1, wherein the electrical field repels particles of the first electroactive material from the second electroactive material in the medium.

8. The method of claim 1, further comprising providing an ionically conductive material in the electronically insulating separation between the first and second electroactive materials.

9. The method of claim 8, wherein the ionically conductive material is a liquid electrolyte.

10. The method of claim 1, wherein the medium includes a polymer, and wherein preserving the electronically insulating separation between the first and second electroactive materials includes solidifying or drying the polymer to form a solid polymer electrolyte.

11. The method of claim 1, wherein the second electroactive material has a three-dimensional structure defining a void space, and wherein the field causes particles of the first electroactive material to concentrate in the void space.

12. The method of claim 11, wherein the second electroactive material is a porous electrode, and wherein the field causes particles of the first electroactive material to concentrate in the pore space of the porous electrode.

13. The method of claim 12, wherein the porous electrode is a reticulated open-cell carbon, metal or ceramic foam.

14. The method of claim 1, the second electroactive material comprising particles wherein particles of at least one of the first and second electroactive materials are coated with a conductive material.

15. The method of claim 1, wherein at least one of the terminals is patterned to include a serpentine, spiral, or comb-like region and further comprising depositing at least a portion of the first or second electroactive material in the region.

16. The method of claim 1, wherein the first and second terminals are constructed and arranged to be interdigitated.

17. The method of claim 1, the second electroactive material comprising particles, wherein causing particles of the first electroactive material to forming an electronically continuous first electrode comprises depositing particles of the first electroactive material, and wherein the method further comprises generating a second field causing particles of the second electroactive material to deposit on the second terminal, thereby forming an electronically continuous second electrode.

18. The method of claim 17, wherein the act of generating an electric field while creating an electronically insulating separation between the first and second electroactive materials further comprises creating an electronically insulating separation between the first and second electrodes; and
   wherein the act of preserving the electronically insulating separation between the first and second electroactive materials comprises preserving the electronically insulating separation between the first and second electrodes.

19. The method of claim 17, wherein the first and second electrodes are formed simultaneously.

20. The method of claim 17, wherein the first and second electrodes are formed sequentially.

* * * * *

UNITED STATES PATENT AND TRADEMARK OFFICE
CERTIFICATE OF CORRECTION

PATENT NO. : 7,662,265 B2  Page 1 of 1
APPLICATION NO. : 11/108602
DATED : February 16, 2010
INVENTOR(S) : Chiang et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1223 days.

Signed and Sealed this

Thirtieth Day of November, 2010

David J. Kappos
*Director of the United States Patent and Trademark Office*